US011158878B2

(12) United States Patent
Manabe et al.

(10) Patent No.: US 11,158,878 B2
(45) Date of Patent: Oct. 26, 2021

(54) ELECTROCHEMICAL REACTION CELL STACK

(71) Applicant: MORIMURA SOFC TECHNOLOGY CO., LTD., Komaki (JP)

(72) Inventors: Kenta Manabe, Nagoya (JP); Nobuyuki Hotta, Nagoya (JP); Takafumi Shichida, Nagoya (JP); Yuki Ota, Nagoya (JP)

(73) Assignee: MORIMURA SOFC TECHNOLOGY CO., LTD., Komaki (JP)

( * ) Notice: Subject to any disclaimer, the term of this patent is extended or adjusted under 35 U.S.C. 154(b) by 44 days.

(21) Appl. No.: 16/342,844

(22) PCT Filed: Sep. 26, 2017

(86) PCT No.: PCT/JP2017/034657
§ 371 (c)(1),
(2) Date: Apr. 17, 2019

(87) PCT Pub. No.: WO2018/083911
PCT Pub. Date: May 11, 2018

(65) Prior Publication Data
US 2019/0267658 A1 Aug. 29, 2019

(30) Foreign Application Priority Data
Nov. 4, 2016 (JP) .............................. JP2016-216295

(51) Int. Cl.
*H01M 8/2465* (2016.01)
*H01M 8/04007* (2016.01)
(Continued)

(52) U.S. Cl.
CPC ..... *H01M 8/2465* (2013.01); *H01M 8/04067* (2013.01); *H01M 8/12* (2013.01); *H01M 8/2425* (2013.01); *H01M 2008/1293* (2013.01)

(58) Field of Classification Search
CPC .. H01M 8/04067; H01M 8/12; H01M 8/2425; H01M 2008/1293
See application file for complete search history.

(56) References Cited

U.S. PATENT DOCUMENTS

2006/0172176 A1 8/2006 MacBain et al.
2008/0248349 A1 10/2008 McElroy et al.
(Continued)

FOREIGN PATENT DOCUMENTS

JP 2006-338921 A 12/2006
JP 2014-197492 A 10/2014
KR 10-2015-0135501 A 12/2015

OTHER PUBLICATIONS

Search Report dated Nov. 28, 2017, issued by the International Searching Authority in counterpart International Patent Application No. PCT/JP2017/034657.
(Continued)

Primary Examiner — Sarah A. Slifka
Assistant Examiner — Patrick Marshall Greene
(74) Attorney, Agent, or Firm — Sughrue Mion, PLLC

(57) ABSTRACT

An electrochemical reaction cell stack includes an electrochemical reaction block including three or more electrochemical reaction units arranged in a first direction; a first heat-absorbing member which is disposed on one side of the electrochemical reaction block in the first direction and absorbs heat generated from the electrochemical reaction block; and a second heat-absorbing member which is disposed on the other side of the electrochemical reaction block in the first direction and absorbs heat generated from the electrochemical reaction block. An upstream electrochemical reaction unit is disposed between the first heat-absorbing member and the downstream electrochemical reaction unit disposed closest to the first heat-absorbing member, and an upstream electrochemical reaction unit is disposed between
(Continued)

the second heat-absorbing member and the downstream electrochemical reaction unit disposed closest to the second heat-absorbing member.

4 Claims, 17 Drawing Sheets

(51) Int. Cl.
*H01M 8/12* (2016.01)
*H01M 8/2425* (2016.01)
*H01M 8/124* (2016.01)

(56) References Cited

U.S. PATENT DOCUMENTS

| | | | |
|---|---|---|---|
| 2012/0077105 A1* | 3/2012 | Lee | H01M 8/2485 |
| | | | 429/452 |
| 2014/0295308 A1 | 10/2014 | Tsuga et al. | |
| 2014/0349209 A1* | 11/2014 | Todo | H01M 8/2425 |
| | | | 429/458 |
| 2016/0056492 A1 | 2/2016 | Tsuga et al. | |

OTHER PUBLICATIONS

Communication dated May 19, 2020 from the European Patent Office in application No. 17867420.6.
Communication dated Aug. 25, 2020, issued by the Korean Intellectual Property Office in corresponding Korean Application No. 10-2019-7011893.

* cited by examiner

ELECTROCHEMICAL REACTION CELL STACK

CROSS REFERENCE TO RELATED APPLICATIONS

This application is a National Stage of International Application No. PCT/JP2017/034657, filed Sep. 26, 2017, claiming priority based on Japanese Patent Application No. 2016-216295, filed Nov. 4, 2016.

TECHNICAL FIELD

A technique disclosed in the present specification relates to an electrochemical reaction cell stack.

BACKGROUND ART

A known type of a fuel cell for generating electricity by utilizing electrochemical reaction between hydrogen and oxygen is a solid oxide fuel cell (hereinafter may be referred to as "SOFC") including an electrolyte layer containing a solid oxide. In general, an SOFC is used in the form of a fuel cell stack including a plurality of fuel cell electricity generation units (hereinafter referred to simply as "electricity generation units") arranged in a predetermined direction (hereinafter may be referred to as a "direction of array"). An electricity generation unit is the smallest unit of the SOFC for electricity generation, and includes an electrolyte layer, a cathode and an anode which face each other with the electrolyte layer intervening therebetween, and an anode chamber formed so as to face the anode.

Known fuel cell stacks include a so-called parallel-series fuel cell stack (see, for example, Patent Document 1). Such a parallel-series fuel cell stack includes a plurality of electricity generation units including upstream electricity generation units (e.g., one or more electricity generation units to which a gas supplied into the fuel cell stack and used for electricity generation is supplied first) and downstream electricity generation units (e.g., one or more electricity generation units to which a gas discharged from one or more upstream electricity generation units and used for electricity generation is supplied). The parallel-series fuel cell stack also includes a gas flow passage which communicates with an anode chamber facing an anode included in an upstream electricity generation unit and with an anode chamber facing an anode included in a downstream electricity generation unit, and which introduces, for example, hydrogen contained in the gas discharged from the anode chamber of the upstream electricity generation unit into the anode chamber of the downstream electricity generation unit. The parallel-series fuel cell stack can achieve an increase in fuel utilization rate; i.e., the ratio of the amount of a fuel gas used for electricity generating reaction to the amount of the fuel gas supplied to the anode chambers.

PRIOR ART DOCUMENT

Patent Document

Patent Document 1: Japanese Patent Application Laid-Open (kokai) No. 2014-197492

SUMMARY OF THE INVENTION

Problem to be Solved by the Invention

In the parallel-series fuel cell stack, the hydrogen concentration of the fuel gas supplied to the anode chamber of the downstream electricity generation unit, which is located on the downstream side in the gas flow direction, is lower than the hydrogen concentration of the fuel gas supplied to the anode chamber of the upstream electricity generation unit, which is located on the upstream side in the gas flow direction. In the case where the downstream electricity generation unit is adjacent to a heat-absorbing member, which absorbs heat from the electricity generation unit, such as an end plate disposed at one end of a plurality of electricity generation units in the direction of array, the temperature of the downstream electricity generation unit decreases under the condition that the hydrogen concentration of the fuel gas is low, resulting in a problem that the downstream electricity generation unit tends to exhibit poor electricity generation performance.

Such a problem is common with an electrolysis cell stack, which is a form of a solid oxide electrolysis cell (hereinafter may be referred to as "SOEC") for generating hydrogen by utilizing the electrolysis of water. In the present specification, a fuel cell stack and an electrolysis cell stack are collectively referred to as an "electrochemical reaction cell stack."

The present specification discloses a technique capable of solving at least partially the aforementioned problem.

Means for Solving the Problem

A technique disclosed in the present specification can be implemented in the following modes.

(1) An electrochemical reaction cell stack disclosed in the present specification comprises an electrochemical reaction block including three or more electrochemical reaction units arranged in a first direction, each of the electrochemical reaction units including an electrolyte layer, a cathode and an anode which face each other in the first direction with the electrolyte layer intervening therebetween, and an anode chamber facing the anode; a first heat-absorbing member which is disposed on one side of the electrochemical reaction block in the first direction and absorbs heat generated from the electrochemical reaction block; and a second heat-absorbing member which is disposed on the other side of the electrochemical reaction block in the first direction and absorbs heat generated from the electrochemical reaction block. In the electrochemical reaction cell stack, the three or more electrochemical reaction units include two or more upstream electrochemical reaction units, and one or more downstream electrochemical reaction units; the electrochemical reaction cell stack includes a gas flow passage which communicates with the anode chamber included in each of the two or more upstream electrochemical reaction units and with the anode chamber included in each of the one or more downstream electrochemical reaction units, and which introduces a gas discharged from the upstream anode chamber into the downstream anode chamber; the upstream electrochemical reaction unit(s) is(are) disposed between the first heat-absorbing member and the downstream electrochemical reaction unit disposed closest to the first heat-absorbing member; and the upstream electrochemical reaction unit(s) is(are) disposed between the second heat-absorbing member and the downstream electrochemical reaction unit disposed closest to the second heat-absorbing member. Since the concentration of hydrogen (i.e., fuel gas) supplied to the anode chamber of each upstream electrochemical reaction unit is higher than that of hydrogen supplied to the anode chamber of each downstream electrochemical reaction unit, the amount of electricity generated by each upstream electrochemical reaction unit is greater that the amount of electricity generated by each downstream electrochemical reaction unit. Thus, since the amount of heat generated in each upstream electrochemical reaction unit is larger than that of heat generated in each downstream electrochemical reaction unit, a decrease in temperature caused by the heat-absorbing member has a relatively small effect on electrochemical reaction performance in the upstream electrochemical reaction unit. According to the present electrochemical reaction cell stack, the upstream electrochemical reaction unit(s) is(are) disposed between each heat-absorbing member and the downstream electrochemical reaction unit disposed closest to the heat-absorbing member. By virtue of this configuration, as compared with the case where the downstream electrochemical reaction unit is adjacent to the heat-absorbing member, a decrease in the temperature of the downstream electrochemical reaction unit is suppressed, whereby deterioration of the electrochemical reaction performance of the downstream electrochemical reaction unit is suppressed. As a result, there can be suppressed deterioration of the electrochemical reaction performance of the entire electrochemical reaction block.

(2) In the above-described electrochemical reaction cell stack, the first heat-absorbing member may be a heat exchange member which exchanges heat between a gas introduced into the first heat-absorbing member and the electrochemical reaction unit adjacent to the first heat-absorbing member in the first direction; and the second heat-absorbing member may be an end plate disposed at one end of the electrochemical reaction cell stack in the first direction. According to the present electrochemical reaction cell stack, deterioration of the electrochemical reaction performance of the downstream electrochemical reaction unit is suppressed in the electrochemical reaction block disposed between the heat exchange member and the end plate. As a result, there can be suppressed deterioration of the electrochemical reaction performance of the entire electrochemical reaction block.

(3) The above-described electrochemical reaction cell stack may be configured such that the number of the upstream electrochemical reaction units disposed between the first heat-absorbing member and the downstream electrochemical reaction unit disposed closest to the first heat-absorbing member is two or more; and the number of the upstream electrochemical reaction units disposed between the second heat-absorbing member and the downstream electrochemical reaction unit disposed closest to the second heat-absorbing member is two or more. According to the present electrochemical reaction cell stack, as compared with the case where less than two upstream electrochemical reaction units are disposed between each heat-absorbing member and the downstream electrochemical reaction unit disposed closest to the heat-absorbing member, deterioration of the electrochemical reaction performance of the downstream electrochemical reaction unit is more reliably suppressed. Thus, there can be effectively suppressed deterioration of the electrochemical reaction performance of the entire electrochemical reaction block.

The technique disclosed in the present specification can be implemented in various modes; for example, a unit cell, an electrochemical reaction unit, an electrochemical reaction cell stack including the electrochemical reaction unit, an electrochemical reaction module including the electrochemical reaction cell stack, and an electrochemical reaction system including the electrochemical reaction module.

MODES FOR CARRYING OUT THE INVENTION

A. First Embodiment

A-1. Structure:
(Structure of Fuel Cell Stack 100)

Figure 1:
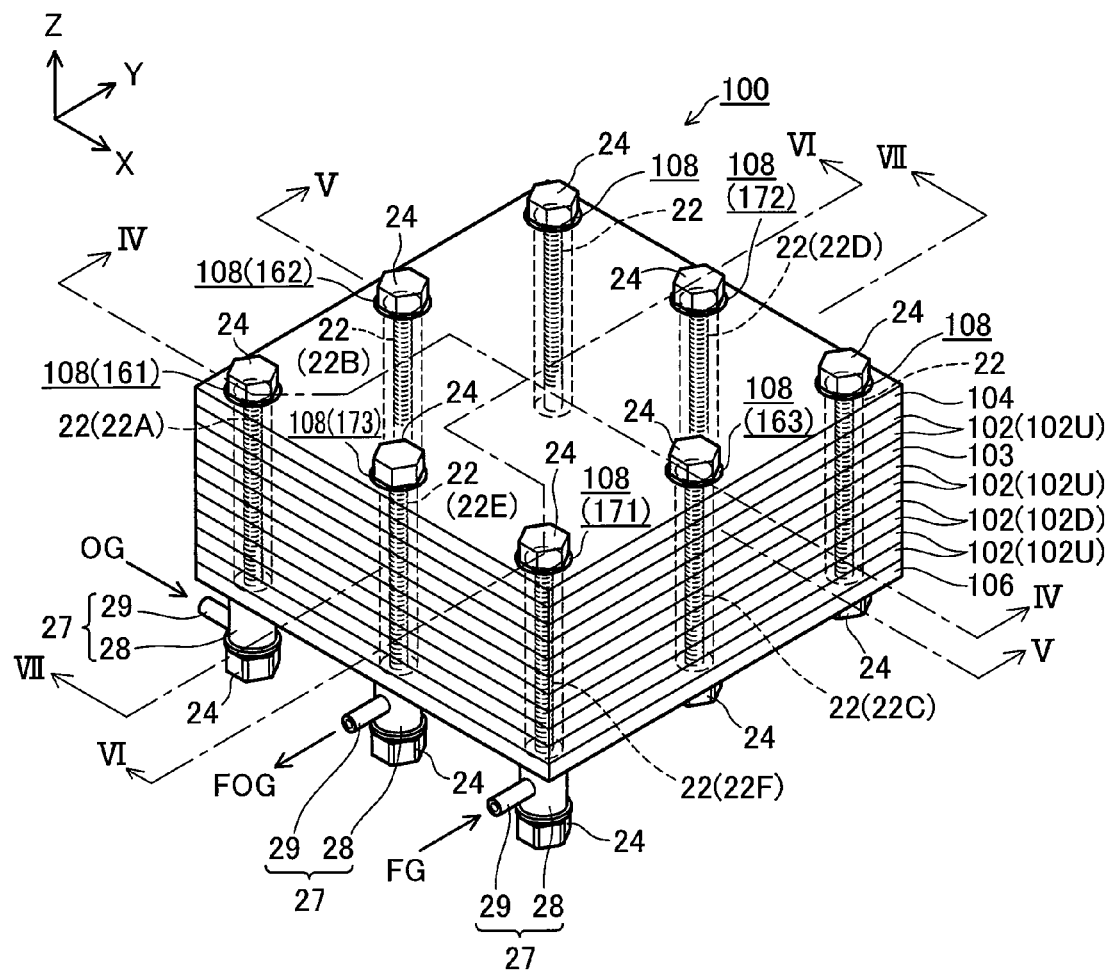
FIG. 1 Perspective view schematically showing the structure of a fuel cell stack 100 according to a first embodiment.
Figure 2:
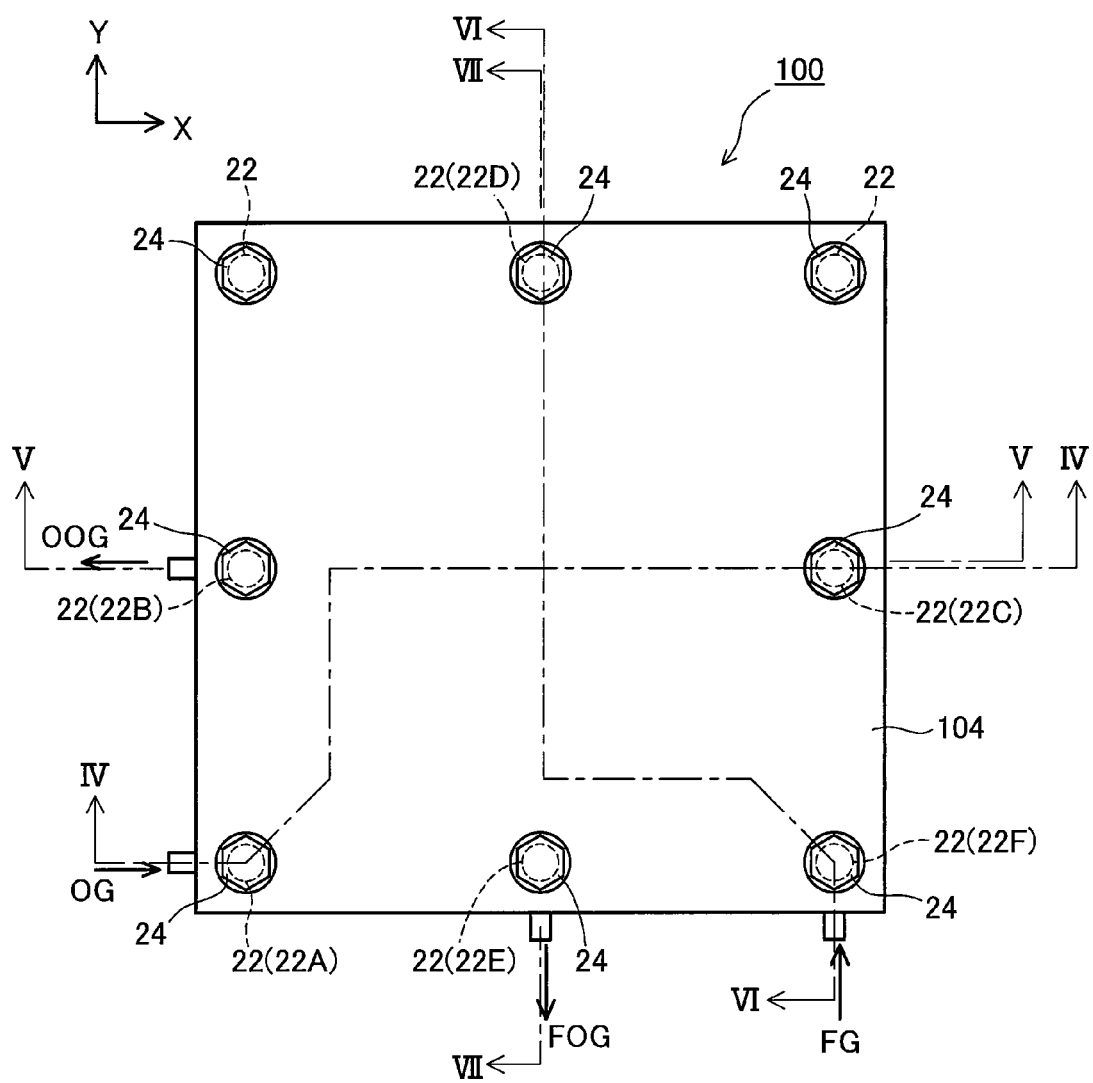
FIG. 2 Explanatory view showing a top surface of the fuel cell stack 100 according to the first embodiment along an XY plane.
Figure 3:
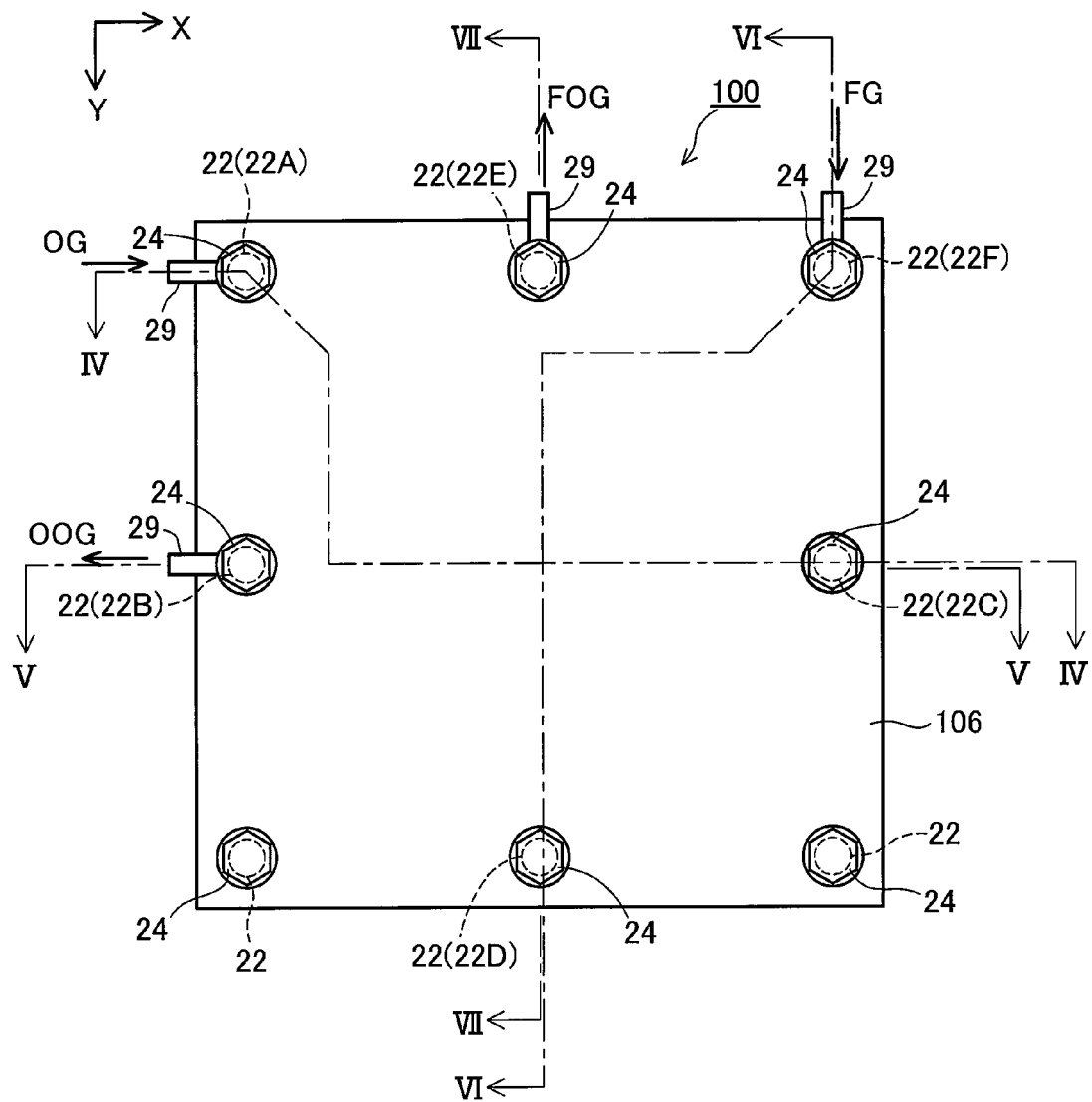
FIG. 3 Explanatory view showing a bottom surface of the fuel cell stack 100 according to the first embodiment along the XY plane.
Figure 4:
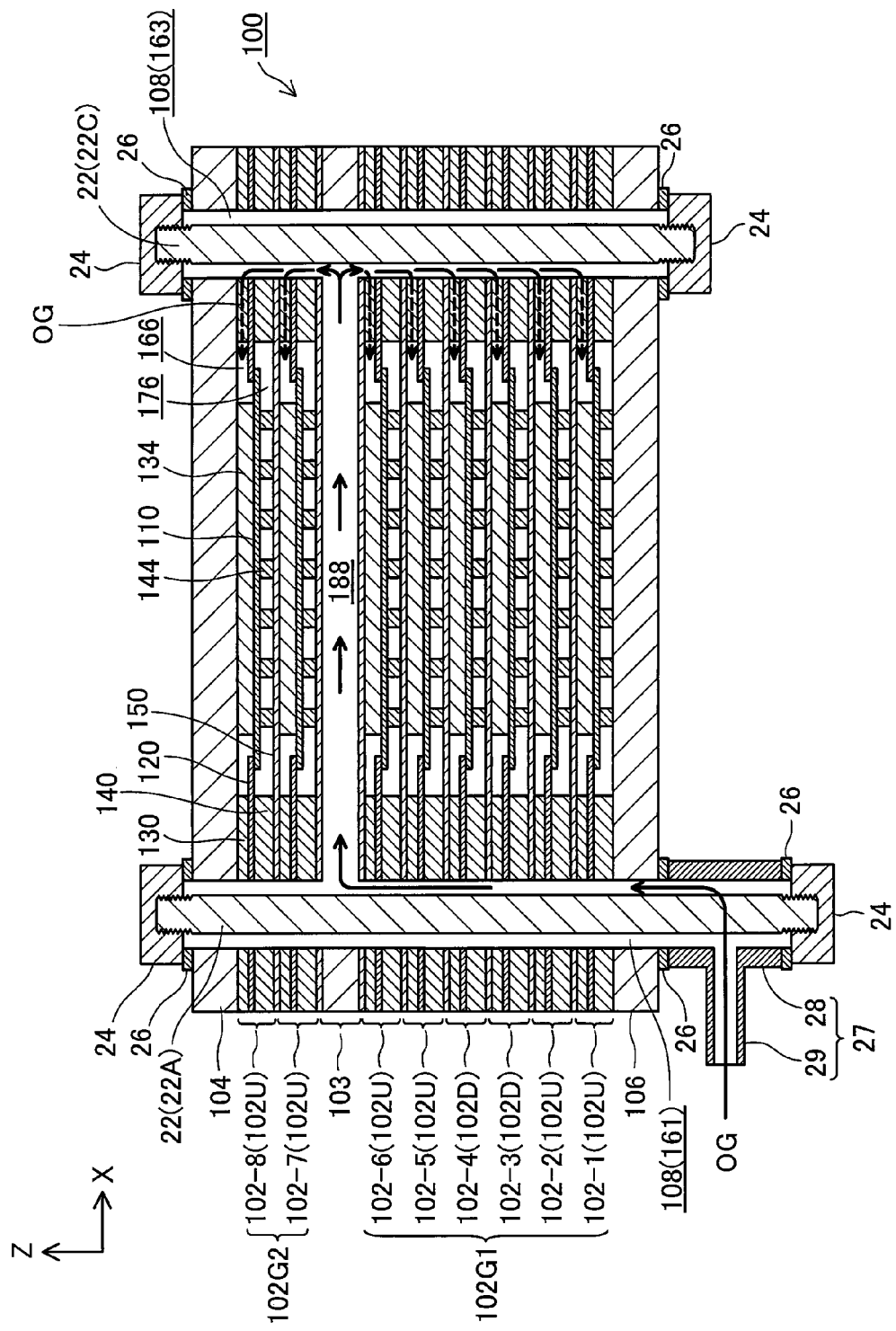
FIG. 4 Explanatory view showing an XZ section of the fuel cell stack 100 taken along line IV-IV of FIGS. 1 to 3.
Figure 5:
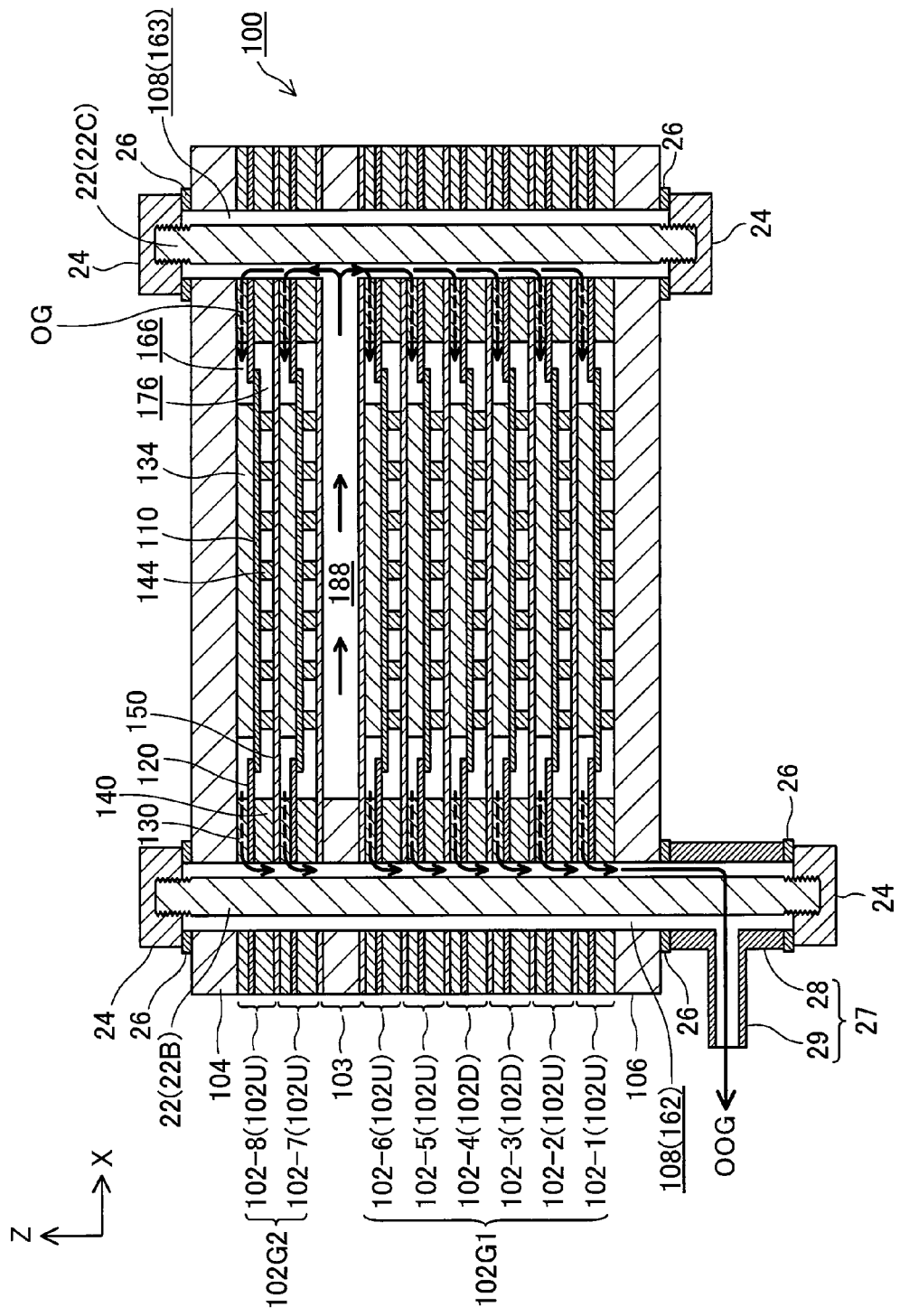
FIG. 5 Explanatory view showing an XZ section of the fuel cell stack 100 taken along line V-V of FIGS. 1 to 3.
Figure 6:
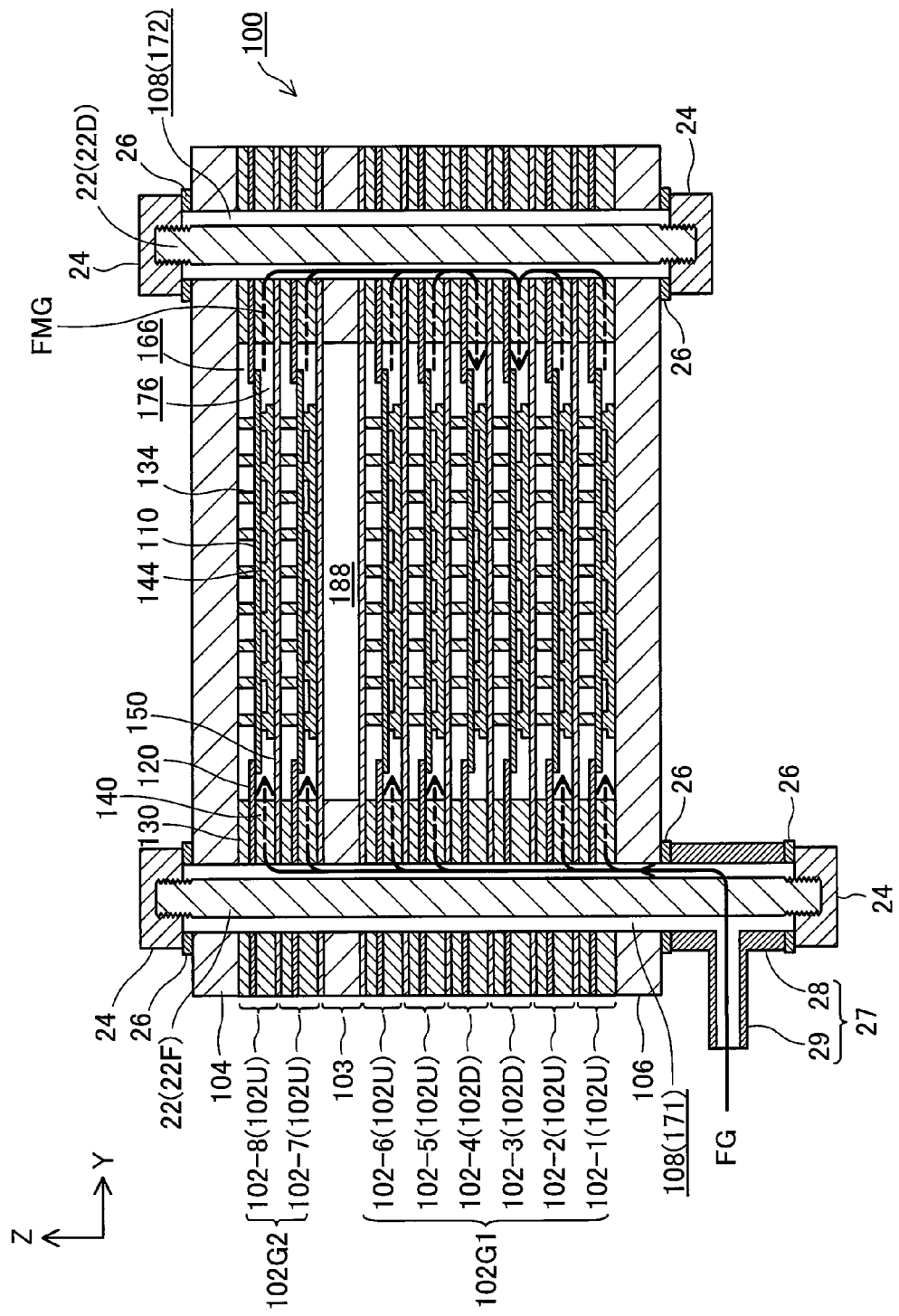
FIG. 6 Explanatory view showing a YZ section of the fuel cell stack 100 taken along line VI-VI of FIGS. 1 to 3.
Figure 7:
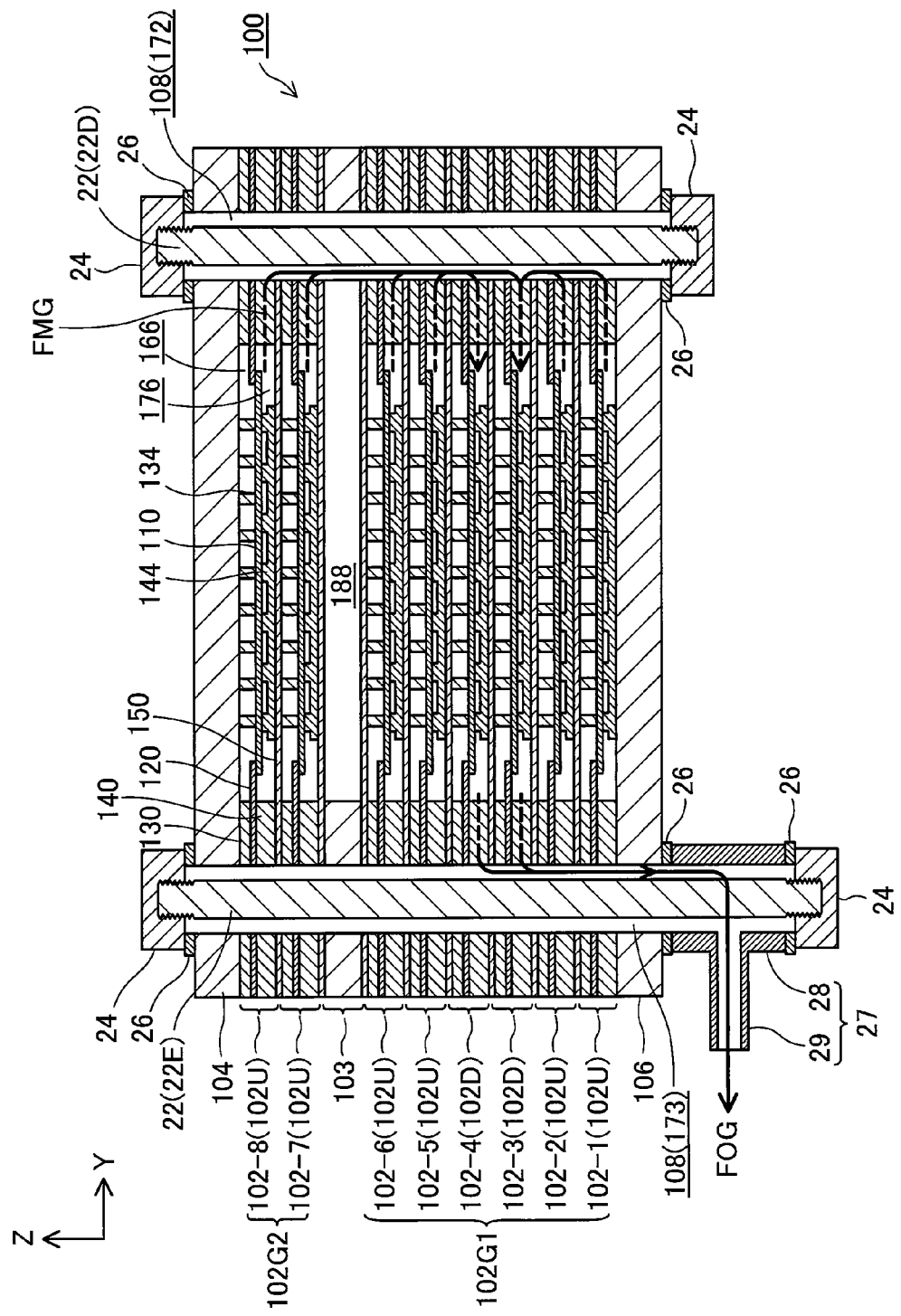
FIG. 7 Explanatory view showing a YZ section of the fuel cell stack 100 taken along line VII-VII of FIGS. 1 to 3.

FIGS. 1 to 7 are explanatory views schematically illustrating the structure of a fuel cell stack 100 according to the present embodiment. FIG. 1 illustrates the external appearance of the fuel cell stack 100; FIG. 2 is a top plan view of the fuel cell stack 100; FIG. 3 is a bottom plan view of the fuel cell stack 100; FIG. 4 is a sectional view of the fuel cell stack 100 taken along line IV-IV of FIGS. 1 to 3; FIG. 5 is a sectional view of the fuel cell stack 100 taken along line V-V of FIGS. 1 to 3; FIG. 6 is a sectional view of the fuel cell stack 100 taken along line VI-VI of FIGS. 1 to 3; and FIG. 7 is a sectional view of the fuel cell stack 100 taken along line VII-VII of FIGS. 1 to 3. FIGS. 1 to 7 show mutually orthogonal X-axis, Y-axis, and Z-axis for specifying respective directions. In the present specification, for the sake of convenience, the positive Z-axis direction is called the "upward direction" and the negative Z-axis direction is called the "downward direction"; however, in actuality, the fuel cell stack 100 may be disposed in a different orientation. The same also applies to FIG. 8 and subsequent drawings.

The fuel cell stack 100 includes a plurality of (eight in the present embodiment) of electricity generation units 102, a heat exchange member 103, and a pair of end plates 104 and 106. The eight electricity generation units 102 are arranged in a predetermined direction of array (in the vertical direction in the present embodiment). Six electricity generation units 102 (the first to sixth units from the lower end of the fuel cell stack 100) of the eight electricity generation units 102 are disposed adjacent to one another, and the remaining two electricity generation units 102 (the first and second units from the upper end of the fuel cell stack 100) are disposed adjacent to each other. The heat exchange member 103 is disposed between the aforementioned six electricity generation units 102 and the remaining two electricity generation units 102. That is, the heat exchange member 103 is disposed at the third position (from the upper end) in an assembly of the eight electricity generation units 102 and the heat exchange member 103. The paired end plates 104 and 106 are disposed in such a manner as to hold the assembly of the eight electricity generation units 102 and the heat exchange member 103 from the upper and lower sides thereof. Hereinafter, the aforementioned six electricity generation units 102 will be referred to as the "first electricity generation block 102G1," and the remaining two electricity generation units 102 will be referred to as the "second electricity generation block 102G2." Among the eight electricity generation units 102, two electricity generation units 102 (the third and fourth units from the lower end of the fuel cell stack 100) will be referred to as the "downstream electricity generation units 102D," and the remaining six electricity generation units 102 will be referred to as the "upstream electricity generation units 102U." Hereafter, the eight electricity generation units 102 are denoted by symbols with serial branch numbers as follows: electricity generation unit 102-1, electricity generation unit 102-2, electricity generation unit 102-3 . . . from the lower side (see FIGS. 4 to 10). The direction of array (vertical direction) corresponds to the first direction appearing in CLAIMS. The upstream electricity generation units 102U correspond to the upstream electrochemical reaction units appearing in CLAIMS, and the downstream electricity generation units 102D correspond to the downstream electrochemical reaction units appearing in CLAIMS. The first electricity generation block 102G1 corresponds to the electrochemical reaction block appearing in CLAIMS.

The fuel cell stack 100 has a plurality (eight in the present embodiment) of holes extending in the vertical direction through peripheral portions about the Z-axis direction of its component layers (the electricity generation units 102, the heat exchange member 103, and the end plates 104 and 106). The corresponding holes formed in the layers communicate with one another in the vertical direction, thereby forming communication holes 108 extending in the vertical direction from one end plate 104 to the other end plate 106. In the following description, individual holes which constitute each communication hole 108 and are formed in the individual layers of the fuel cell stack 100 may be referred to as the "communication holes 108."

Bolts 22 extending in the vertical direction are inserted into the corresponding communication holes 108, and the fuel cell stack 100 is fastened by means of the bolts 22 and nuts 24 engaged with opposite ends of the bolts 22. As shown in FIGS. 4 to 7, corresponding insulation sheets 26 intervene between the nuts 24 engaged with one ends (upper ends) of the bolts 22 and the upper surface of the end plate 104 serving as the upper end of the fuel cell stack 100 and between the nuts 24 engaged with the other ends (lower ends) of the bolts 22 and the lower surface of the end plate 106 serving as the lower end of the fuel cell stack 100. However, in each region where a gas passage member 27, which will be described later, is provided, the gas passage member 27 and the insulation sheets 26 disposed respectively on the upper end and on the lower end of the gas passage member 27 intervene between the nut 24 and the surface of the end plate 106. Each of the insulation sheets 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space is secured between the outer circumferential surface of the shaft portion of each bolt 22 and the inner circumferential surface of each communication hole 108. As shown in FIGS. 2 to 5, a space defined by the bolt 22 (bolt 22A) located around one vertex of the perimeter about the Z-axis direction of the fuel cell stack 100 (a vertex on the negative side in the Y-axis direction and on the negative side in the X-axis direction) and the communication hole 108 into which the bolt 22A is inserted functions as an oxidizer gas introduction manifold 161 (gas flow passage) into which oxidizer gas OG is introduced from the outside of the fuel cell stack 100. Meanwhile, a space defined by the bolt 22 (bolt 22C) located around the midpoint of one side of the perimeter about the Z-axis direction of the fuel cell stack 100 (a side on the positive side in the X-axis direction of two sides parallel to the Y-axis) and the communication hole 108 into which the bolt 22C is inserted functions as an oxidizer gas supply manifold 163 (gas flow passage) for supplying the oxidizer gas OG discharged from the heat exchange member 103 to the electricity generation units 102. As shown in FIGS. 2, 3, and 5, a space defined by the bolt 22 (bolt 22B) located around the midpoint of one side of the perimeter about the Z-axis direction of the fuel cell stack 100 (a side on the negative side in the X-axis direction of two sides parallel to the Y-axis) and the communication hole 108 into which the bolt 22B is inserted functions as an oxidizer gas discharge manifold 162 from which oxidizer offgas OOG discharged from the electricity generation units 102 is discharged to the outside of the fuel cell stack 100. In the present embodiment, for example, air is used as the oxidizer gas OG.

As shown in FIGS. 2, 3, and 6, a space defined by the bolt 22 (bolt 22F) located around one vertex of the perimeter about the Z-axis direction of the fuel cell stack 100 (a vertex on the positive side in the X-axis direction and on the negative side in the Y-axis direction) and the communication hole 108 into which the bolt 22F is inserted functions as a fuel gas introduction manifold 171 into which fuel gas FG is introduced from the outside of the fuel cell stack 100 and which supplies the fuel gas FG to the upstream electricity generation units 102U. A space defined by the bolt 22 (bolt 22D) located around the midpoint of one side of the perimeter about the Z-axis direction of the fuel cell stack 100 (a side on the positive side in the Y-axis direction of two sides parallel to the X-axis) and the communication hole 108 into which the bolt 22D is inserted functions as a fuel gas transfer manifold 172; i.e., a gas flow passage for transferring fuel medium gas FMG (i.e., a gas discharged from the anode chambers 176 of the upstream electricity generation units 102U) to the downstream electricity generation units 102D. The fuel medium gas FMG contains, for example, hydrogen that has not been used for electricity generating reaction in the anode chambers 176 of the upstream electricity generation units 102U. As shown in FIGS. 2, 3, and 7, a space defined by the bolt 22 (bolt 22E) located around the midpoint of one side of the perimeter about the Z-axis direction of the fuel cell stack 100 (a side on the negative side in the Y-axis direction of two sides parallel to the X-axis) and the communication hole 108 into which the bolt 22E is inserted functions as a fuel gas discharge manifold 173 for discharging fuel offgas FOG (i.e., a gas discharged from the anode chambers 176 of the downstream electricity generation units 102D) to the outside of the fuel cell stack 100. In the present embodiment, for example, hydrogen-rich gas reformed from city gas is used as the fuel gas FG. The fuel gas introduction manifold 171 corresponds to the gas introduction flow passage appearing in CLAIMS; the fuel gas transfer manifold 172 corresponds to the gas transfer flow passage appearing in CLAIMS; and the fuel gas discharge manifold 173 corresponds to the gas discharge flow passage appearing in CLAIMS.

As shown in FIGS. 4 to 7, the fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 4, the hole of the body portion 28 of the gas passage member 27 disposed at the position of the bolt 22A which partially defines the oxidizer gas introduction manifold 161 communicates with the oxidizer gas introduction manifold 161. As shown in FIG. 5, the hole of the body portion 28 of the gas passage member 27 disposed at the position of the bolt 22B which partially defines the oxidizer gas discharge manifold 162 communicates with the oxidizer gas discharge manifold 162. As shown in FIG. 6, the hole of the body portion 28 of the gas passage member 27 disposed at the position of the bolt 22F which partially defines the fuel gas introduction manifold 171 communicates with the fuel gas introduction manifold 171. As shown in FIG. 7, the hole of the body portion 28 of the gas passage member 27 disposed at the position of the bolt 22E which partially defines the fuel gas discharge manifold 173 communicates with the fuel gas discharge manifold 173.

(Structure of End Plates 104 and 106)

The paired end plates 104 and 106 are electrically conductive members each having an approximately rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 are held under pressure between the paired end plates 104 and 106. The upper end plate 104 functions as a positive output terminal of the fuel cell stack 100, and the lower end plate 106 functions as a negative output terminal of the fuel cell stack 100.

(Structure of Electricity Generation Unit 102)

Figure 8:
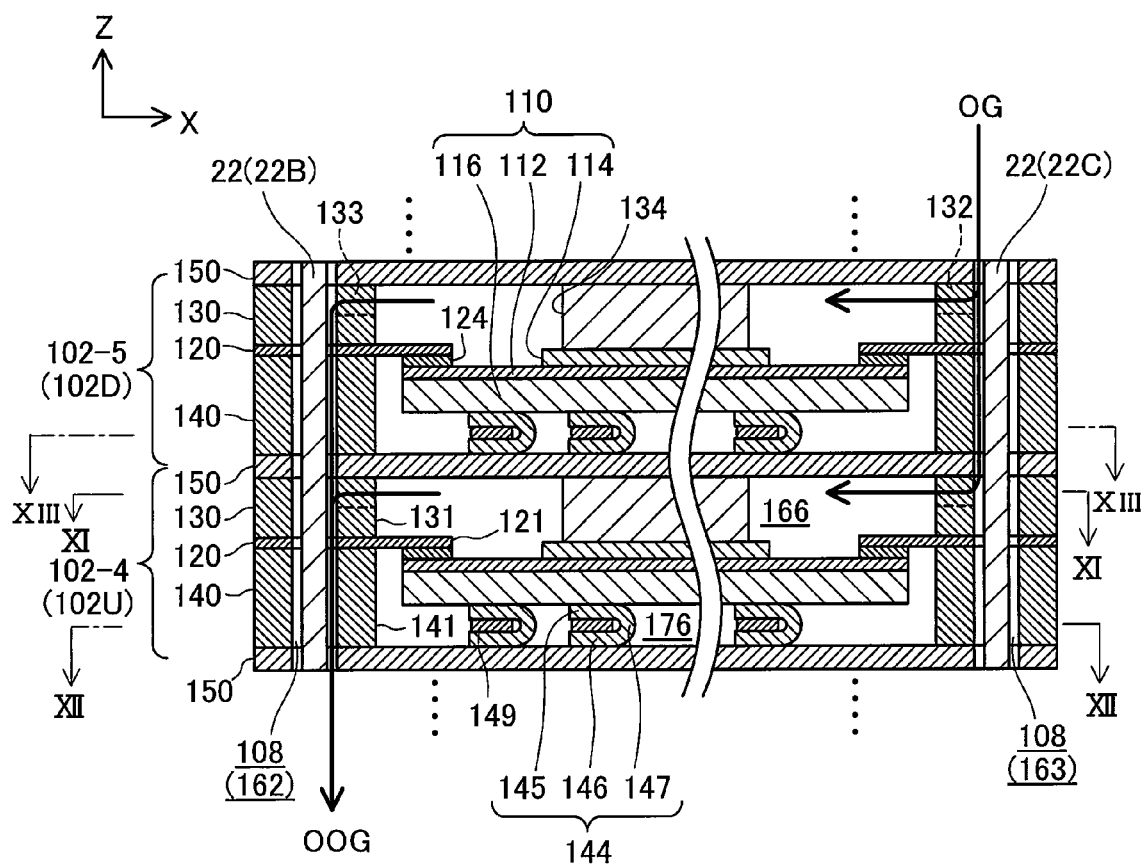
FIG. 8 Explanatory view showing an XZ section of two adjacent downstream and upstream electricity generation units 102 at the same position as that of FIG. 5.
Figure 9:
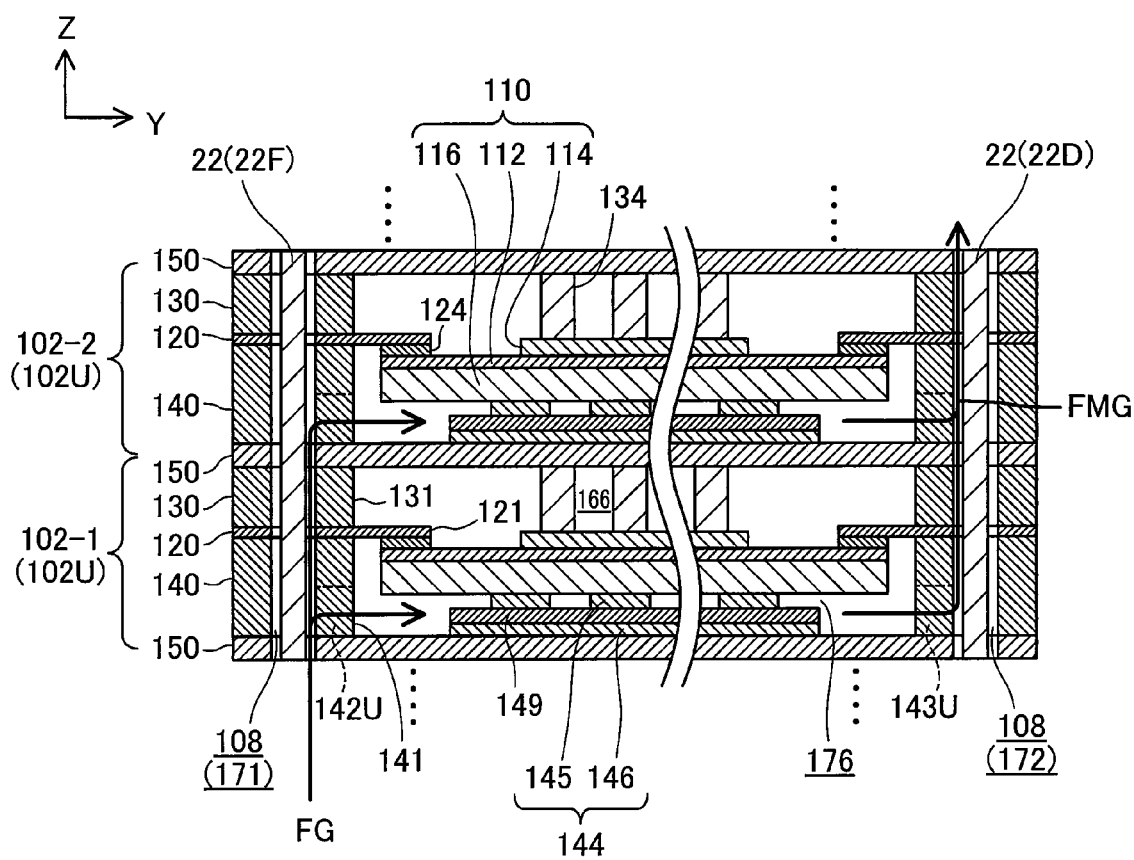
FIG. 9 Explanatory view showing a YZ section of two adjacent upstream electricity generation units 102 at the same position as that of FIG. 6.
Figure 10:
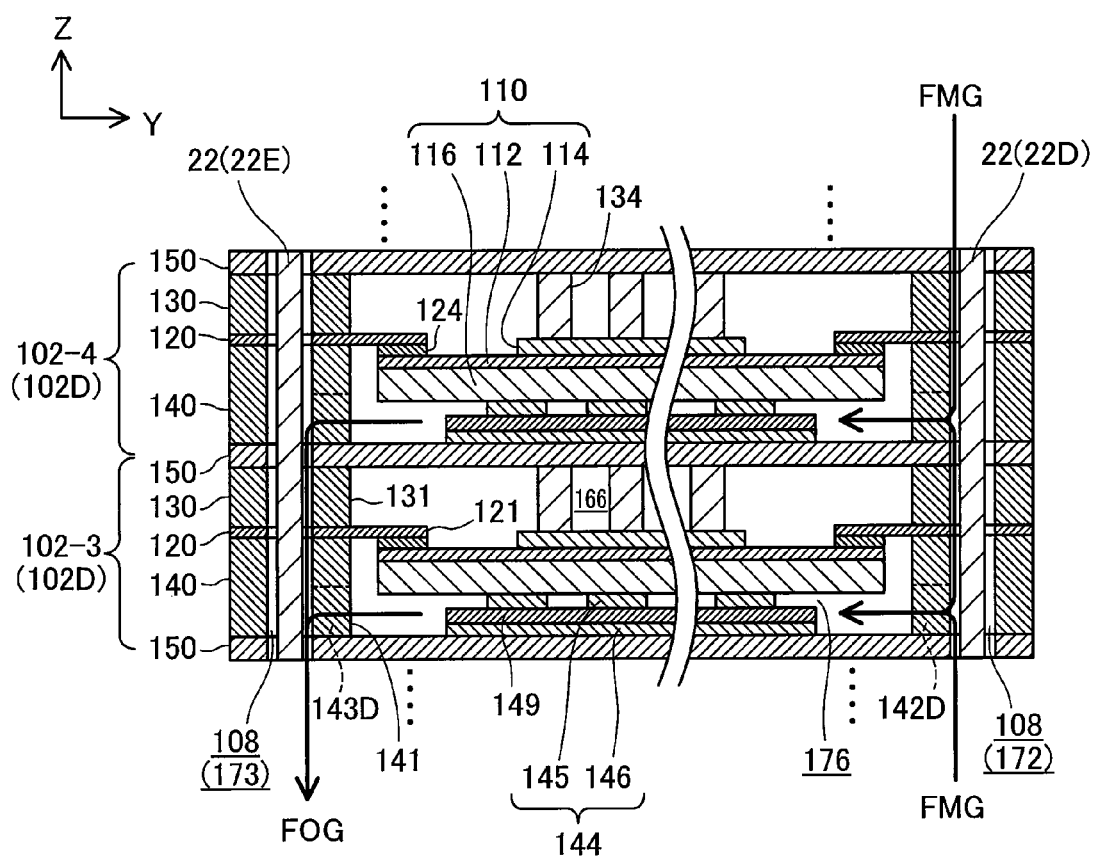
FIG. 10 Explanatory view showing a YZ section of two adjacent downstream electricity generation units 102 at the same position as that of FIG. 7.
Figure 11:
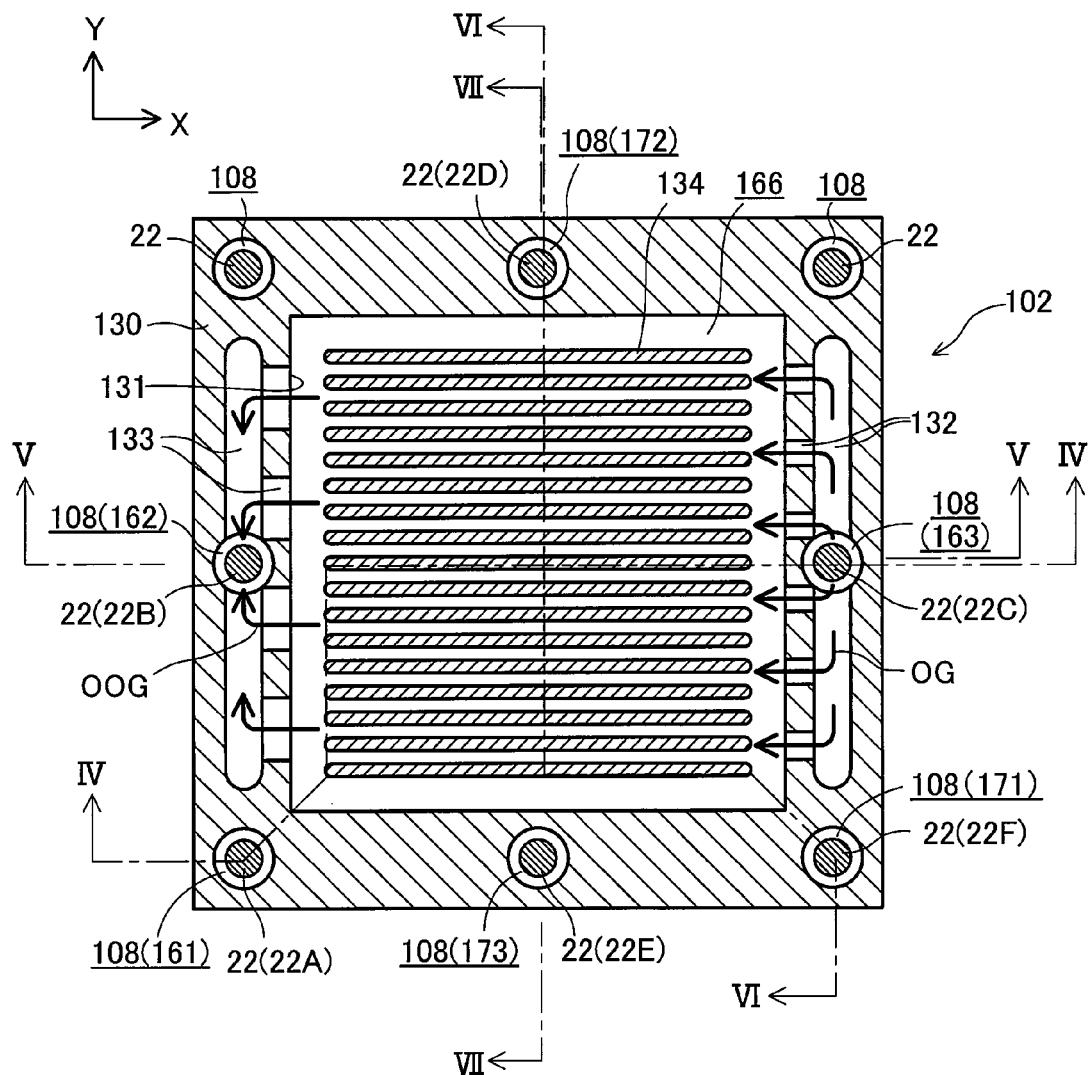
FIG. 11 Explanatory view showing an XY section of an electricity generation unit 102 taken along line XI-XI of FIG. 8.
Figure 12:
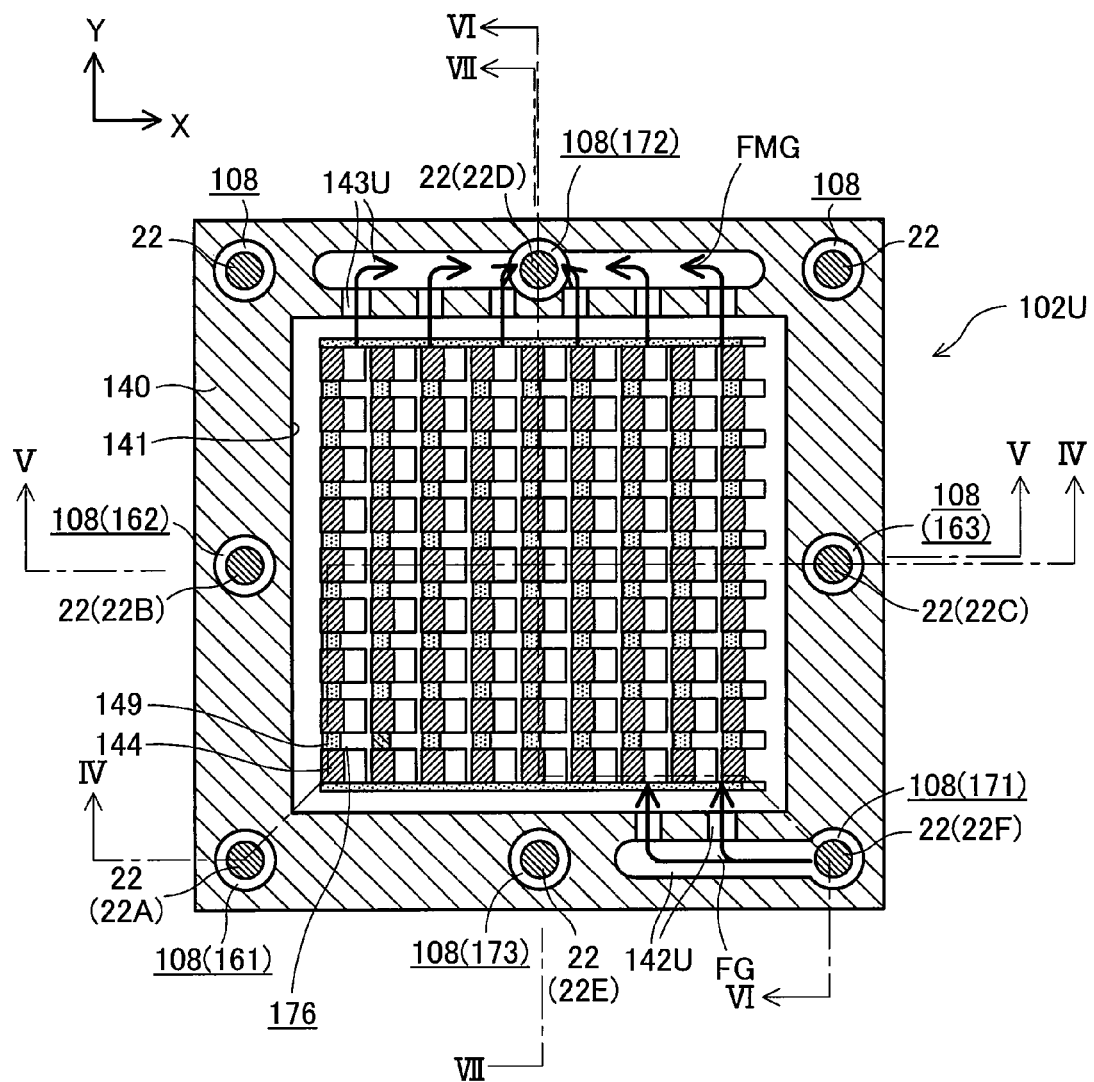
FIG. 12 Explanatory view showing an XY section of an upstream electricity generation unit 102U taken along line XII-XII of FIG. 8.
Figure 13:
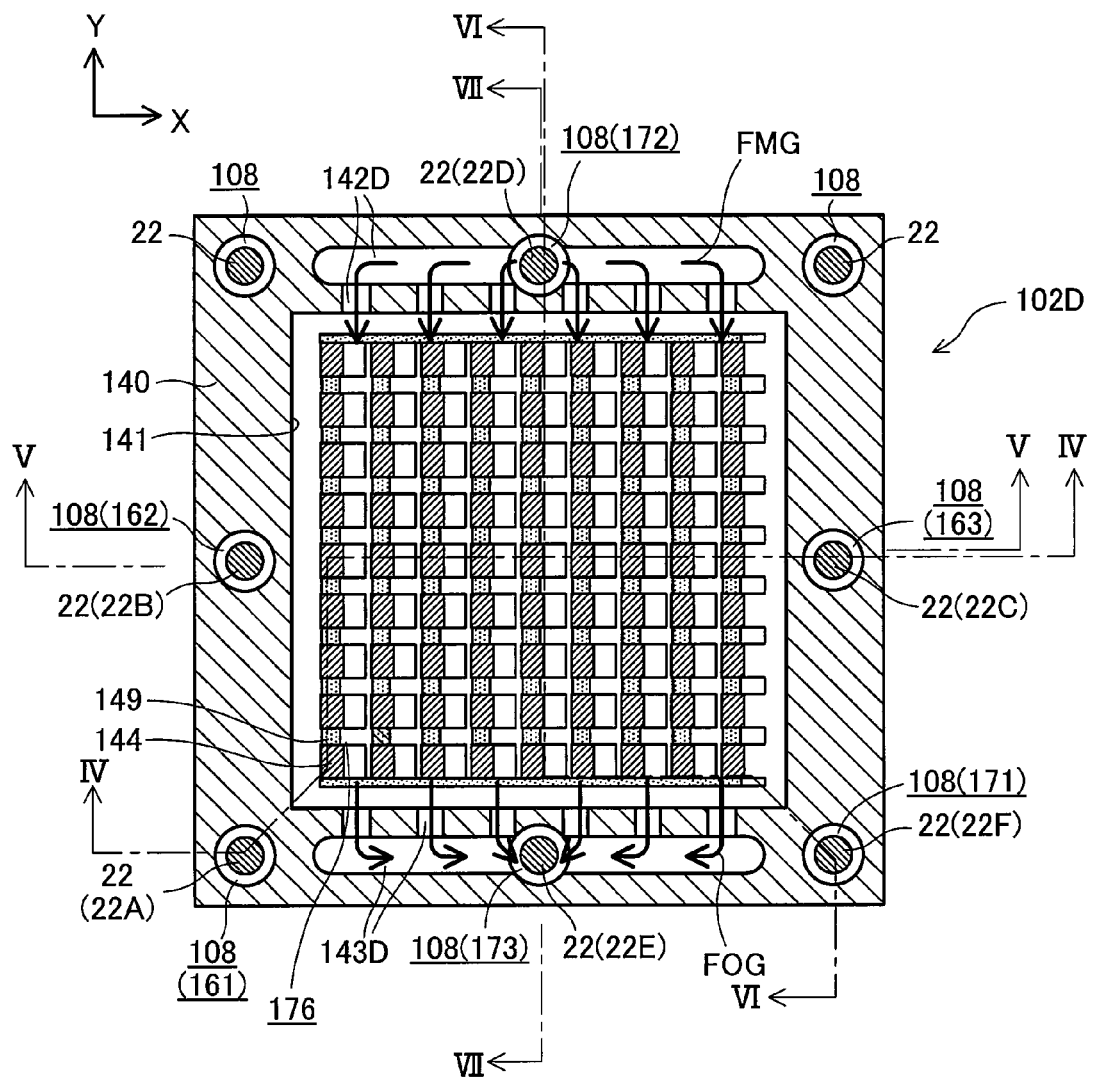
FIG. 13 Explanatory view showing an XY section of a downstream electricity generation unit 102D taken along line XIII-XIII of FIG. 7.

FIGS. 8 to 13 are explanatory views illustrating the specific structure of the electricity generation unit 102. FIG. 8 shows an XZ section of one downstream electricity generation unit 102D and one upstream electricity generation unit 102U adjacent to each other at the same position as that of FIG. 5. FIG. 9 shows a YZ section of two upstream electricity generation units 102U adjacent to each other at the same position as that of FIG. 6. FIG. 10 shows a YZ section of two downstream electricity generation units 102D adjacent to each other at the same position as that of FIG. 7. FIG. 11 illustrates an XY section of the electricity generation unit 102 taken along line XI-XI of FIG. 8. FIG. 12 illustrates an XY section of the upstream electricity generation unit 102U taken along line XII-XII of FIG. 8. FIG. 13 illustrates an XY section of the downstream electricity generation unit 102D taken along line XIII-XIII of FIG. 8.

As shown in FIGS. 8 to 10, each electricity generation unit 102, which is the smallest unit of electricity generation, includes a unit cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. Holes corresponding to the communication holes 108 into which the bolts 22 are inserted are formed in peripheral portions about the Z-axis direction of the separator 120, the cathode-side frame 130, the anode-side frame 140, and the interconnectors 150.

The interconnector 150 is an electrically conductive member having an approximately rectangular flat plate shape and is formed of, for example, ferritic stainless steel. The interconnector 150 secures electrical conductivity between the electricity generation units 102 and prevents mixing of reaction gases between the electricity generation units 102. In the present embodiment, two electricity generation units 102 which are disposed adjacent to each other share one interconnector 150. That is, the upper interconnector 150 of a certain electricity generation unit 102 serves as the lower interconnector 150 of another electricity generation unit 102 which is adjacently located on the upper side of the certain electricity generation unit 102. Also, since the fuel cell stack 100 has the two end plates 104 and 106, the uppermost electricity generation unit 102 of the fuel cell stack 100 does not have the upper interconnector 150, and the lowermost electricity generation unit 102 of the fuel cell stack 100 does not have the lower interconnector 150 (see FIGS. 4 to 7).

The unit cell 110 includes an electrolyte layer 112, and a cathode 114 and an anode 116 which face each other in the vertical direction (in the direction of array of the electricity generation units 102) with the electrolyte layer 112 intervening therebetween. The unit cell 110 of the present embodiment is an anode-support-type unit cell in which the anode 116 supports the electrolyte layer 112 and the cathode 114.

The electrolyte layer 112 is a member having an approximately rectangular flat-plate shape and contains at least Zr. The electrolyte layer 112 is formed of a solid oxide; for example, YSZ (yttria-stabilized zirconia), ScSZ (scandia-stabilized zirconia), or CaSZ (calcia-stabilized zirconia). The cathode 114 is a member having an approximately rectangular flat-plate shape and is formed of, for example, a perovskite-type oxide (e.g., LSCF (lanthanum strontium cobalt ferrite), LSM (lanthanum strontium manganese oxide), or LNF (lanthanum nickel ferrite)). The anode 116 is a member having an approximately rectangular flat-plate shape and is formed of, for example, Ni (nickel), a cermet of Ni and ceramic powder, or an Ni-based alloy. Thus, the unit cell 110 (electricity generation unit 102) of the present embodiment is a solid oxide fuel cell (SOFC) containing a solid oxide as an electrolyte.

The separator 120 is a frame member which has an approximately rectangular hole 121 formed in a central region thereof and extending therethrough in the vertical direction, and is formed of, for example, a metal. A portion of the separator 120 around the hole 121 faces a peripheral portion of the surface of the electrolyte layer 112 on the cathode 114 side. The separator 120 is bonded to the electrolyte layer 112 (unit cell 110) by means of a bonding member 124 formed of a brazing material (e.g., Ag brazing material) and disposed between the facing portion of the separator 120 and the electrolyte layer 112. The separator 120 separates the cathode chamber 166 which faces the cathode 114, and the anode chamber 176 which faces the anode 116, from each other, thereby preventing gas leakage from one electrode side to the other electrode side at a peripheral portion of the unit cell 110. The unit cell 110 to which the separator 120 is bonded is also called a separator-attached unit cell.

As shown in FIGS. 8 to 11, the cathode-side frame 130 is a frame member which has an approximately rectangular hole 131 formed in a central region thereof and extending therethrough in the vertical direction, and is formed of, for example, an insulator such as mica. The cathode-side frame 130 is in contact with a peripheral portion of the surface of the separator 120 on the side opposite the electrolyte layer 112 and with a peripheral portion of the surface of the interconnector 150 on the side toward the cathode 114. The hole 131 of the cathode-side frame 130 partially constitutes the cathode chamber 166 which faces the cathode 114. The cathode-side frame 130 electrically insulates the two interconnectors 150 included in the electricity generation unit 102 from each other. Also, the cathode-side frame 130 has an oxidizer gas supply communication hole 132 formed therein and adapted to establish communication between the oxidizer gas introduction manifold 161 and the cathode chamber 166, and an oxidizer gas discharge communication hole 133 formed therein and adapted to establish communication between the cathode chamber 166 and the oxidizer gas discharge manifold 162.

As shown in FIGS. 8 to 10, 12, and 13, the anode-side frame 140 is a frame member which has an approximately rectangular hole 141 formed in a central region thereof and extending therethrough in the vertical direction, and is formed of, for example, a metal. The hole 141 of the anode-side frame 140 partially constitutes the anode chamber 176 which faces the anode 116. The anode-side frame 140 is in contact with a peripheral portion of the surface of the separator 120 on the side toward the electrolyte layer 112 and with a peripheral portion of the surface of the interconnector 150 on the side toward the anode 116. As shown in FIGS. 9 and 12, the anode-side frame 140 of each upstream electricity generation unit 102U has a fuel gas supply communication hole 142U formed therein and adapted to establish communication between the fuel gas introduction manifold 171 and the anode chamber 176, and a fuel gas discharge communication hole 143U formed therein and adapted to establish communication between the anode chamber 176 and the fuel gas transfer manifold 172. As shown in FIGS. 10 and 13, the anode-side frame 140 of each downstream electricity generation unit 102D has a fuel gas supply communication hole 142D formed therein and adapted to establish communication between the fuel gas transfer manifold 172 and the anode chamber 176, and a fuel gas discharge communication hole 143D formed therein and adapted to establish communication between the anode chamber 176 and the fuel gas discharge manifold 173.

As shown in FIGS. 8 to 11, the cathode-side current collector 134 is disposed within the cathode chamber 166. The cathode-side current collector 134 is composed of a plurality of approximately rectangular columnar conductive members disposed at predetermined intervals, and is formed of, for example, ferritic stainless steel. The cathode-side current collector 134 is in contact with the surface of the cathode 114 on the side opposite the electrolyte layer 112 and with the surface of the interconnector 150 on the side toward the cathode 114. As described above, since the electricity generation unit 102 disposed at the uppermost position in the fuel cell stack 100 does not have the upper interconnector 150, the cathode-side current collector 134 in the uppermost electricity generation unit 102 is in contact with the upper end plate 104. Since the cathode-side current collector 134 is thus configured, the cathode-side current collector 134 electrically connects the cathode 114 and the interconnector 150 (or the end plate 104) to each other. The cathode-side current collector 134 and the interconnector 150 may be integrally formed as a unitary member.

As shown in FIGS. 8 to 10, 12, and 13, the anode-side current collector 144 is disposed within the anode chamber 176. The anode-side current collector 144 includes an interconnector facing portion 146, a plurality of electrode facing portions 145, and a connection portion 147 which connects each electrode facing portion 145 to the interconnector facing portion 146, and is formed of, for example, nickel, a nickel alloy, or stainless steel. Each electrode facing portion 145 is in contact with the surface of the anode 116 on the side opposite the electrolyte layer 112, and the interconnector facing portion 146 is in contact with the surface of the interconnector 150 on the side toward the anode 116. As described above, since the electricity generation unit 102 disposed at the lowermost position in the fuel cell stack 100 does not have the lower interconnector 150, the interconnector facing portion 146 in the lowermost electricity generation unit 102 is in contact with the lower end plate 106. Since the anode-side current collector 144 is thus configured, the anode-side current collector 144 electrically connects the anode 116 and the interconnector 150 (or the end plate 106) to each other. Spacers 149 formed of, for example, mica are disposed between the electrode facing portions 145 and the interconnector facing portion 146. Thus, the anode-side current collector 144 follows the deformation of the electricity generation unit 102 stemming from a temperature cycle and a pressure variation of reaction gas, thereby maintaining good electrical connection between the anode 116 and the interconnector 150 (or the end plate 106) via the anode-side current collector 144.

(Structure of Heat Exchange Member 103)

Figure 14:
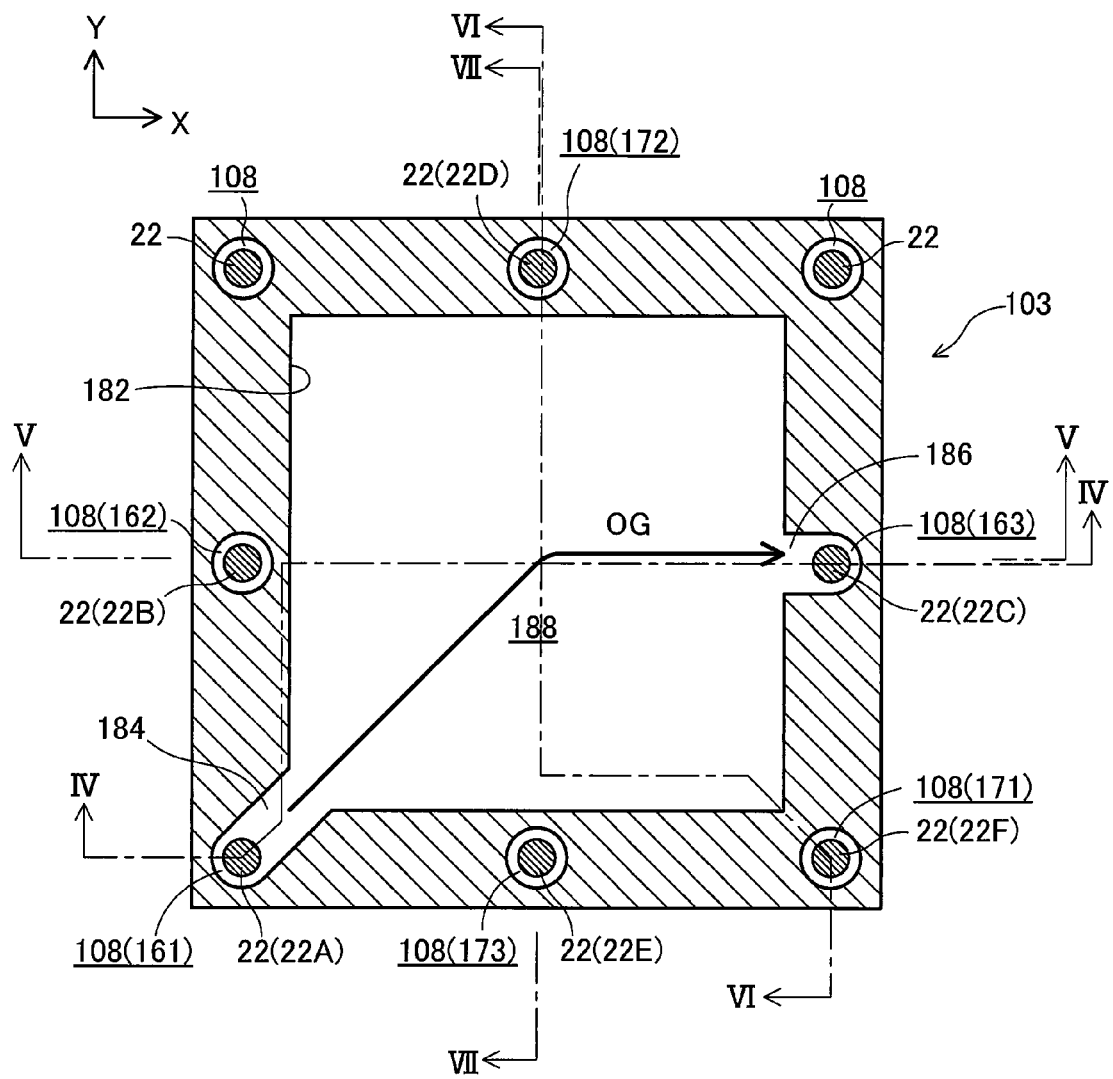
FIG. 14 Explanatory view schematically showing an XY section of a heat exchange member 103.

FIG. 14 illustrates a cross section of the heat exchange member 103 in the direction perpendicular to the direction of array. As shown in FIGS. 4 to 7 and 14, the heat exchange member 103 is a member having a rectangular flat-plate shape and is formed of, for example, ferritic stainless steel. The heat exchange member 103 has a hole 182 formed in a central region thereof and extending therethrough in the vertical direction. The heat exchange member 103 also has a communication hole 184 adapted to establish communication between the central hole 182 and the communication hole 108 forming the oxidizer gas introduction manifold 161, and a communication hole 186 adapted to establish communication between the central hole 182 and the communication hole 108 forming the oxidizer gas supply manifold 163. The heat exchange member 103 is sandwiched between the lower interconnector 150 included in the electricity generation unit 102 (102-7) upwardly adjacent to the heat exchange member 103 and the upper interconnector 150 included in the electricity generation unit 102 (102-6) downwardly adjacent to the heat exchange member 103. A space defined between these interconnectors 150 by the hole 182 and the communication holes 184 and 186 functions as a heat exchange flow passage 188 through which the oxidizer gas OG flows for heat exchange as described below.

A-2. Operation of Fuel Cell Stack 100:

As shown in FIG. 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27. As shown in FIGS. 4 and 14, the oxidizer gas OG supplied to the oxidizer gas introduction manifold 161 flows through the heat exchange flow passage 188 formed in the heat exchange member 103 and then is discharged to the oxidizer gas supply manifold 163. The heat exchange member 103 is adjacent to the electricity generation unit 102 located on the upper side thereof and is adjacent to the electricity generation unit 102 located on the lower side thereof. As described below, the electricity generating reaction in the electricity generation unit 102 is an exothermic reaction. Thus, when the oxidizer gas OG passes through the heat exchange flow passage 188 in the heat exchange member 103, heat exchange occurs between the oxidizer gas OG and the adjacent electricity generation units 102, resulting in an increase in the temperature of the oxidizer gas OG. Since the oxidizer gas introduction manifold 161 does not communicate with the cathode chambers 166 of the electricity generation units 102, the oxidizer gas OG is not supplied from the oxidizer gas introduction manifold 161 to the cathode chambers 166 of the electricity generation units 102. As shown in FIGS. 4, 5, 8, and 11, the oxidizer gas OG discharged to the oxidizer gas supply manifold 163 is supplied from the oxidizer gas supply manifold 163 to the cathode chambers 166 through the oxidizer gas supply communication holes 132 of the electricity generation units 102.

As shown in FIGS. 6, 9, and 12, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the anode chambers 176 of the upstream electricity generation units 102U through the fuel gas supply communication holes 142U of the upstream electricity generation units 102U. Since the fuel gas introduction manifold 171 does not communicate with the anode chambers 176 of the downstream electricity generation units 102D, the fuel gas FG is not supplied from the fuel gas introduction manifold 171 to the anode chambers 176 of the downstream electricity generation units 102D. The fuel medium gas FMG discharged from the anode chambers 176 of the upstream electricity generation units 102U is discharged to the fuel gas transfer manifold 172 through the fuel gas discharge communication holes 143U. As shown in FIGS. 7, 10, and 13, the fuel medium gas FMG discharged from the upstream electricity generation units 102U is supplied to the anode chambers 176 of the downstream electricity generation units 102D through the fuel gas transfer manifold 172 and the fuel gas supply communication holes 142D of the downstream electricity generation units 102D.

When the oxidizer gas OG is supplied to the cathode chamber 166 of each upstream electricity generation unit 102U, and the fuel gas FG is supplied to the anode chamber 176 of the upstream electricity generation unit 102U, the unit cell 110 of the upstream electricity generation unit 102U generates electricity through the electrochemical reaction between the oxidizer gas OG and the fuel gas FG. When the oxidizer gas OG is supplied to the cathode chamber 166 of each downstream electricity generation unit 102D, and the fuel medium gas FMG is supplied to the anode chamber 176 of the downstream electricity generation unit 102D, the unit cell 110 of the downstream electricity generation unit 102D generates electricity through the electrochemical reaction between the oxidizer gas OG and the fuel medium gas FMG. These electricity generating reactions are exothermic reactions. In each electricity generation unit 102, the cathode 114 of the unit cell 110 is electrically connected to one interconnector 150 through the cathode-side current collector 134, whereas the anode 116 is electrically connected to the other interconnector 150 through the anode-side current collector 144. A plurality of the electricity generation units 102 included in the fuel cell stack 100 are connected electrically in series via the heat exchange member 103. Accordingly, electric energy generated in the electricity generation units 102 is output from the end plates 104 and 106 which function as output terminals of the fuel cell stack 100. Since electricity is generated at a relatively high temperature (e.g., 700° C. to 1,000° C.) in the SOFC, the fuel cell stack 100 may be heated by a heater (not shown) from startup until the high temperature can be maintained by means of heat generated as a result of generation of electricity.

As shown in FIGS. 5, 8, and 11, the oxidizer offgas OOG discharged from the cathode chambers 166 of the downstream and upstream electricity generation units 102D and 102U is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. As shown in FIGS. 7, 10, and 13, the fuel offgas FOG discharged from the anode chambers 176 of the downstream electricity generation units 102D is discharged to the fuel gas discharge manifold 173 through the fuel gas discharge communication holes 143D, passes through the holes of the body portion 28 and the branch portion 29 of the gas passage member 27 provided at the position of the fuel gas discharge manifold 173, and is then discharged to the outside of the fuel cell stack 100 through a gas pipe (not shown) connected to the branch portion 29. Thus, the fuel gas FG flow passage of the fuel cell stack 100 has a so-called parallel-series structure; i.e., the fuel gas FG introduced from the outside is supplied parallelly to a plurality of upstream electricity generation units 102U, and the fuel medium gas FMG discharged from the upstream electricity generation units 102U is supplied parallelly to a plurality of downstream electricity generation units 102D through the fuel gas transfer manifold 172.

A-3. Heat-Absorbing Members (Heat Exchange Member 103 and End Plates 104 and 106):

Each of the heat exchange member 103 and the end plates 104 and 106 is a heat-absorbing member that absorbs heat generated from the adjacent electricity generation block 102G1 or 102G2. Specifically, as described above, the heat exchange member 103 is adjacent to the first electricity generation block 102G1 and the second electricity generation block 102G2. Thus, when the oxidizer gas OG passes through the heat exchange flow passage 188 of the heat exchange member 103, heat exchange occurs between the oxidizer gas OG and the electricity generation units 102, resulting in an increase in the temperature of the oxidizer gas OG. An increase in the temperature of the oxidizer gas OG passing through the heat exchange member 103 as a result of heat exchange between the oxidizer gas OG and the electricity generation units 102 indicates that the heat exchange member 103 absorbs at least heat generated from the electricity generation units 102-6 and 102-7 (the electricity generation blocks 102G1 and 102G2) adjacent to the heat exchange member 103. Only one surface of each end plate 104 or 106 is adjacent to the corresponding electricity generation unit 102, and the other surface of the end plate is not adjacent to the corresponding electricity generation unit 102. That is, one surface of each end plate 104 or 106 is exposed to a high temperature atmosphere whose temperature is relatively high due to the electricity generating reaction of the electricity generation block 102G1 or 102G2, whereas the other surface of the end plate is not exposed to the high temperature atmosphere, but exposed to an atmosphere (e.g., outside air) having a temperature lower than that of the electricity generation block 102G1 or 102G2. Thus, heat exchange occurs between outside air and the electricity generation block 102G2 adjacent to the end plate 104, resulting in a slight decrease in the temperature of the electricity generation unit 102 adjacent to the end plate 104. Similarly, heat exchange occurs between outside air and the electricity generation block 102G1 adjacent to the end plate 106, resulting in a slight decrease in the temperature of the electricity generation unit 102 adjacent to the end plate 106. This indicates that the end plate 104 absorbs heat generated from the electricity generation unit 102-8 (electricity generation block 102G2) adjacent to the end plate 104 and that the end plate 106 absorbs heat generated from the electricity generation unit 102-1 (electricity generation block 102G1) adjacent to the end plate 106. The heat exchange member 103 and the end plate 104 or 106 correspond to the first heat-absorbing member and the second heat-absorbing member appearing in CLAIMS, respectively, and the heat exchange member 103 also corresponds to the heat exchange member appearing in CLAIMS.

A-4. Positional Relationship Between Electricity Generation Unit 102 and Heat-Absorbing Member:

In the fuel cell stack 100, the downstream electricity generation units 102D are disposed away from the heat-absorbing member with the upstream electricity generation units 102U intervening therebetween. Specifically, in the first electricity generation block 102G1, the two upstream electricity generation units 102U (102-5 and 102-6) are disposed between the heat exchange member 103 and the downstream electricity generation unit 102D (102-4), which is disposed closest to the heat exchange member 103 among the two adjacent downstream electricity generation units 102D (102-3 and 102-4). Also, the two upstream electricity generation units 102U (102-1 and 102-2) are disposed between the end plate 106 and the downstream electricity generation unit 102D (102-3), which is disposed closest to the end plate 106. The second electricity generation block 102G2 does not include the downstream electricity generation unit 102D, but includes only the upstream electricity generation units 102U (120-7 and 102-8).

As described above, the fuel medium gas FMG discharged from each upstream electricity generation unit 102U is supplied to the anode chamber 176 of each downstream electricity generation unit 102D via the fuel gas transfer manifold 172. Thus, the hydrogen concentration of the fuel gas FG supplied to the anode chamber 176 of each downstream electricity generation unit 102D is lower than the hydrogen concentration of the fuel gas FG supplied to the anode chamber 176 of each upstream electricity generation unit 102U. If a downstream electricity generation unit 102D is disposed adjacent to the heat-absorbing member, the temperature of the downstream electricity generation unit 102D decreases. Due to the decrease in the temperature of the downstream electricity generation unit 102D in addition to the low hydrogen concentration of the fuel gas FG in the downstream electricity generation unit 102D, electricity generating reaction may be less likely to occur, and electricity generation performance may be lowered.

In contrast, in the present embodiment, the downstream electricity generation unit 102D is disposed away from the heat-absorbing member with the upstream electricity generation unit 102U intervening therebetween. Thus, a decrease in the temperature of the downstream electricity generation unit 102D, which occurs through heat absorption by the heat-absorbing member, can be suppressed, thereby suppressing deterioration of the electricity generation performance of the downstream electricity generation unit 102D, as compared with the case where the downstream electricity generation unit 102D is adjacent to the heat-absorbing member. The temperature of the upstream electricity generation unit 102U, which is adjacent to the heat-absorbing member, decreases through heat absorption by the heat-absorbing member. However, electricity generating reaction occurs to a great degree and a large amount of heat is generated in the upstream electricity generation unit 102U, since the hydrogen concentration of the fuel gas FG supplied to the anode chamber 176 of each upstream electricity generation unit 102U is higher than that of the fuel gas FG supplied to the anode chamber 176 of each downstream electricity generation unit 102D. Thus, the effect of heat absorption by the heat-absorbing member on the electricity generation performance is smaller in each upstream electricity generation unit 102U than in each downstream electricity generation unit 102D. Therefore, according to the present embodiment, the deterioration of the electricity generation performance of the first electricity generation block 102G1 (fuel cell stack 100) can be suppressed as a whole.

In the present embodiment, the two upstream electricity generation units 102U are disposed between the downstream electricity generation units 102D and the heat-absorbing member, and thus deterioration of the electricity generation performance of the downstream electricity generation units 102D can be more reliably suppressed, as compared with the case where less than two upstream electricity generation units 102U are disposed between the downstream electricity generation units 102D and the heat-absorbing member. Consequently, the deterioration of the electricity generation performance of the first electricity generation block 102G1 (fuel cell stack 100) can be effectively suppressed as a whole.

A-5. Total Volume of Introduction Communication Passage and Discharge Communication Passage in Anode Chamber 176:

In the present embodiment, the total volume of the fuel gas supply communication hole 142D (downstream introduction communication passage) and the fuel gas discharge communication hole 143D (downstream discharge communication passage) in each downstream electricity generation unit 102D (hereinafter the total volume may be referred to as the "downstream communication volume") is smaller than the total volume of the fuel gas supply communication hole 142U (upstream introduction communication passage) and the fuel gas discharge communication hole 143U (upstream discharge communication passage) in the upstream electricity generation unit 102U (hereinafter the total volume may be referred to as the "upstream communication volume"). Specifically, the opening area (or the width dimension parallel with the unit cell 110) of the fuel gas supply communication hole 142D and the fuel gas discharge communication hole 143D is smaller than the opening area of the fuel gas supply communication hole 142U and the fuel gas discharge communication hole 143U. The length of the fuel gas supply communication hole 142D and the fuel gas discharge communication hole 143D in the gas flow direction may be smaller than the length of the fuel gas supply communication hole 142U and the fuel gas discharge communication hole 143U in the gas flow direction.

The smaller the total volume (communication volume) of the fuel gas supply communication hole 142 and the fuel gas discharge communication hole 143 in each electricity generation unit 102, the larger the pressure loss of the fuel gas FG in the electricity generation unit 102. Meanwhile, there is a tendency that the smaller the communication volume in each electricity generation unit 102, the smaller the percent reduction in fuel utilization rate in each electricity generation unit 102, and thus the smaller the difference in fuel utilization rate between a plurality of the electricity generation units 102. According to the present embodiment, the downstream communication volume in each downstream electricity generation unit 102D is smaller than the upstream communication volume in any upstream electricity generation unit 102U. Thus, fuel shortage due to a difference in fuel gas FG pressure loss between the downstream electricity generation units 102D can be prevented while securing the supply of a sufficient amount of fuel gas FG to the upstream electricity generation units 102U, thereby suppressing deterioration of the performance of the entire fuel cell stack 100. Accordingly, there can be prevented problems (e.g., breakage of the unit cell 110), which would otherwise occur due to a thermal stress caused by a variation in temperature distribution in the cell surface, which results from local electricity generating reaction due to fuel shortage.

Figure 15:
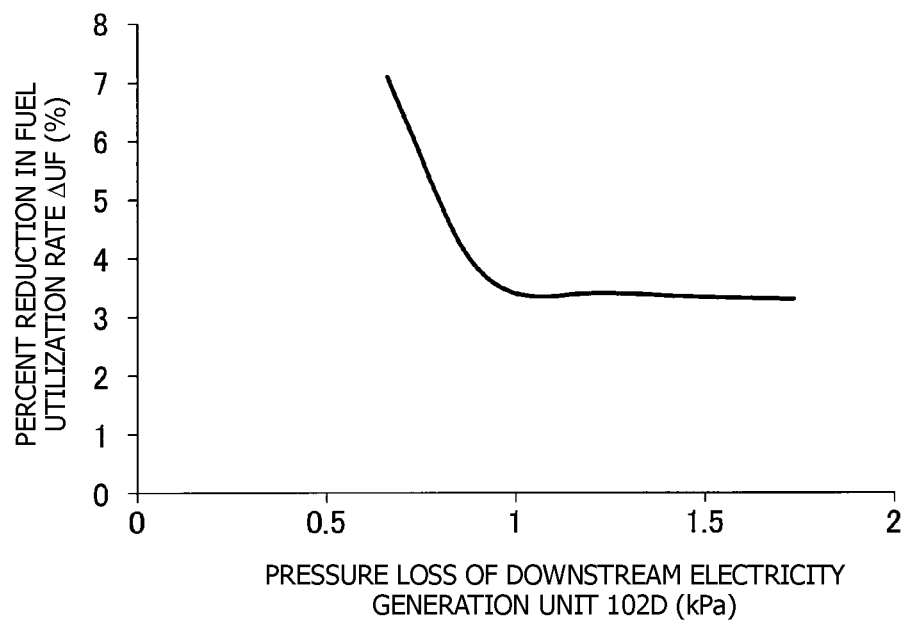
FIG. 15 Explanatory view showing the relationship between a percent reduction in fuel utilization rate and the pressure loss of a downstream electricity generation unit 102.
Figure 16:
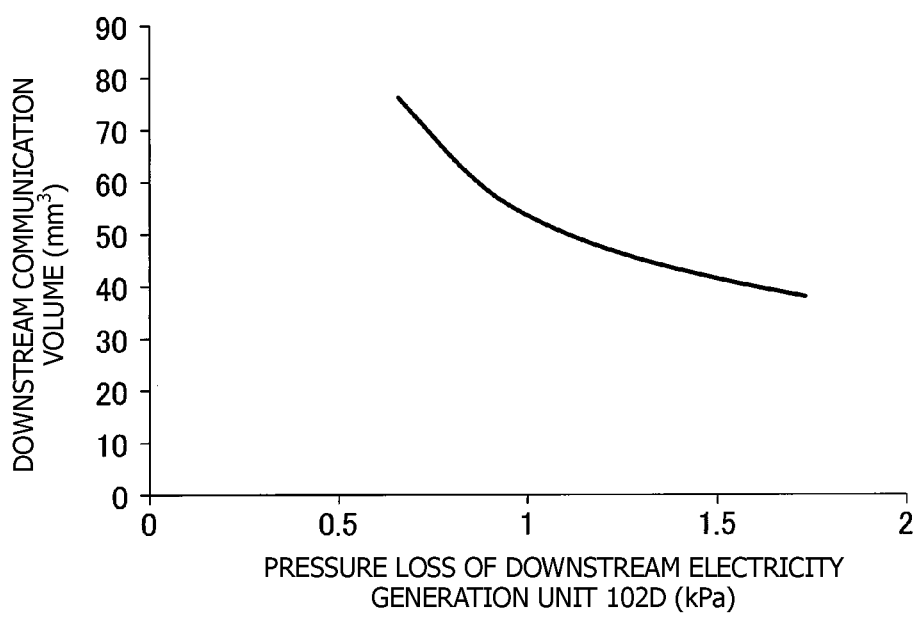
FIG. 16 Explanatory view showing the relationship between downstream communication volume and the pressure loss of a downstream electricity generation unit 102.
Figure 17:
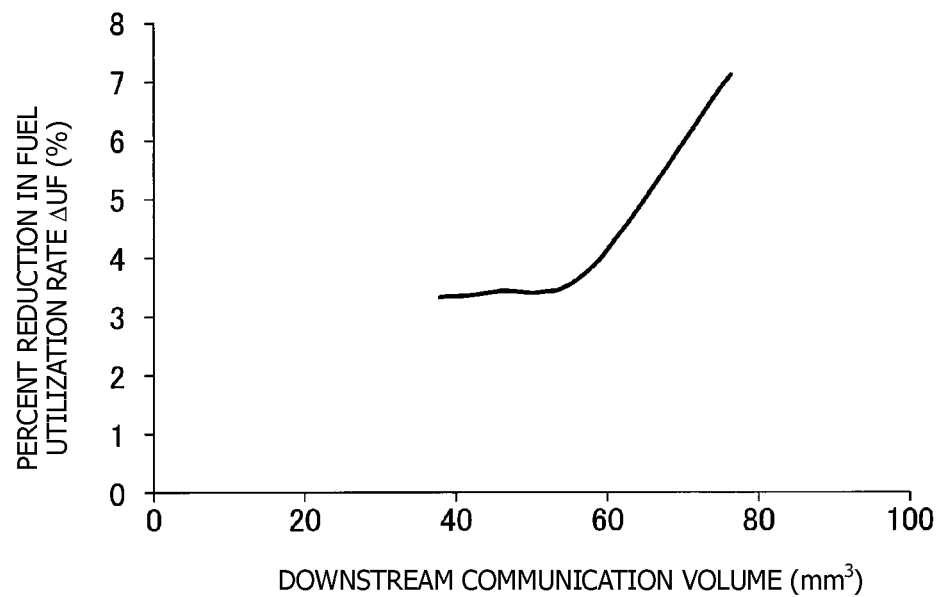
FIG. 17 Explanatory view showing the relationship between a percent reduction in fuel utilization rate and downstream communication volume.

FIG. 15 is an explanatory view showing the relationship between a percent reduction in fuel utilization rate ΔUf (%) and the pressure loss (kPa) of a downstream electricity generation unit 102. FIG. 16 is an explanatory view showing the relationship between downstream communication volume (mm$^3$) and the pressure loss of a downstream electricity generation unit 102. FIG. 17 is an explanatory view showing the relationship between a percent reduction in fuel utilization rate and downstream communication volume. As shown in FIG. 15, an increase in the pressure loss of a downstream electricity generation unit 102D leads to a decrease in the percent reduction in fuel utilization rate. The percent reduction in fuel utilization rate becomes almost constant when the pressure loss of the downstream electricity generation unit 102D reaches about 1 (kPa). As shown in FIG. 16, a decrease in downstream communication volume leads to an increase in the pressure loss of the downstream electricity generation unit 102D. As shown in FIG. 17, a decrease in downstream communication volume leads to a decrease in the percent reduction in fuel utilization rate. The percent reduction in fuel utilization rate becomes almost constant when the downstream communication volume reaches about 60 (mm$^3$). Thus, as described above, when the downstream communication volume in each downstream electricity generation unit 102D is smaller than the upstream communication volume in any upstream electricity generation unit 102U, the percent reduction in fuel utilization rate can be decreased, thereby preventing fuel shortage in the downstream electricity generation unit 102D. Specifically, in the case where the downstream communication volume is larger than 60 (mm$^3$), the pressure loss of the downstream electricity generation unit 102 decreases, and the percent reduction in fuel utilization rate increases as described above. However, in the case where the downstream communication volume is 60 (mm$^3$) or less, although the pressure loss of the downstream electricity generation unit 102 increases with a decrease in downstream communication volume (see FIG. 16), the percent reduction in fuel utilization rate becomes almost constant regardless of the downstream communication volume (see FIG. 17). This indicates that when the downstream communication volume is 60 (mm$^3$) or less in each of a plurality of electricity generation units 102D, the fuel utilization rate becomes almost uniform between the electricity generation units 102D, and thus fuel shortage is less likely to occur in some of the downstream electricity generation units 102D. Therefore, in the present embodiment, the downstream communication volume is preferably 60 (mm$^3$) or less, more preferably 50 (mm$^3$) or less, much more preferably 40 (mm$^3$) or less. In such a preferred case, a difference in fuel utilization rate is reduced between a plurality of electricity generation units 102D, and thus deterioration of the performance of the entire fuel cell stack 100 can be more reliably suppressed. The "percent reduction in fuel utilization rate ΔUf (%)" shown in FIG. 15 corresponds to a difference in fuel utilization rate between an electricity generation unit 102D exhibiting the highest fuel utilization rate and an electricity generation unit 102D exhibiting the lowest fuel utilization rate among a plurality of downstream electricity generation units 102D.

B. Second Embodiment

Figure 18:
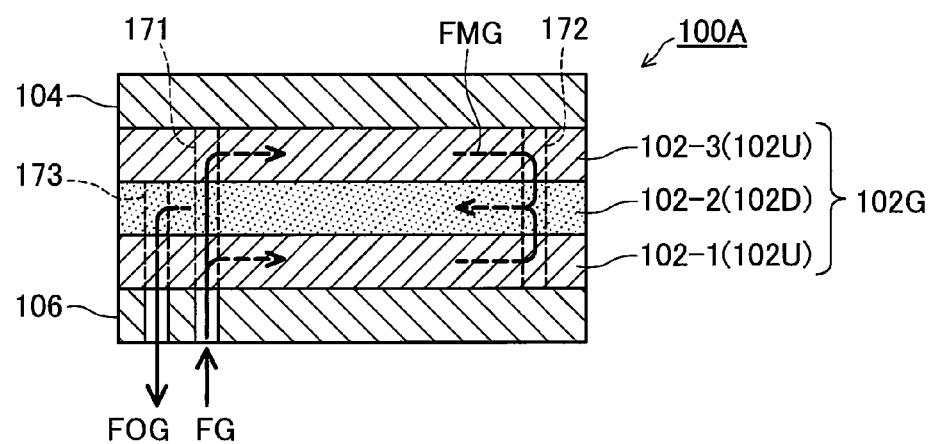
FIG. 18 Explanatory view showing the positional relationship between electricity generation units 102 and end plates 104 and 106 in a fuel cell stack 100A according to a second embodiment.

FIG. 18 is an explanatory view showing the positional relationship between electricity generation units 102 and end plates 104 and 106 in a fuel cell stack 100A according to a second embodiment. In FIG. 18, the structure of each electricity generation unit 102 is simplified, and a fuel gas introduction manifold 171, a fuel gas transfer manifold 172, and a fuel gas discharge manifold 173 are shown by dotted lines. In the fuel cell stack 100A according to the second embodiment, the same components as those in the aforementioned fuel cell stack 100 of the first embodiment are denoted by the same reference numerals, and description thereof is omitted.

As shown in FIG. 18, the fuel cell stack 100A includes an electricity generation block 102G including three electricity generation units 102 (102-1 to 102-3), and a pair of end plates 104 and 106. The fuel cell stack 100A does not include a heat exchange member. The three electricity generation units 102 are arranged in a predetermined direction of array (in the vertical direction in the present embodiment). Among the three electricity generation units 102 of the fuel cell stack 100A, two electricity generation units 102-1 and 102-3 (i.e., the first and third units from the lower end) are upstream electricity generation units 102U, and one electricity generation unit 102-2 (i.e., the second unit from the lower end) is a downstream electricity generation unit 102D. Thus, the downstream electricity generation unit 102D is disposed away from the end plate 104 or 106, serving as a heat-absorbing member, with one upstream electricity generation unit 102U intervening therebetween. Therefore, as compared with the case where the downstream electricity generation unit 102D is adjacent to the heat-absorbing member, a decrease in the temperature of the downstream electricity generation unit 102D, which occurs through heat absorption by the heat-absorbing member, can be suppressed. Thus, deterioration of the electricity generation performance of the downstream electricity generation unit 102D is suppressed.

C. Third Embodiment

Figure 19:
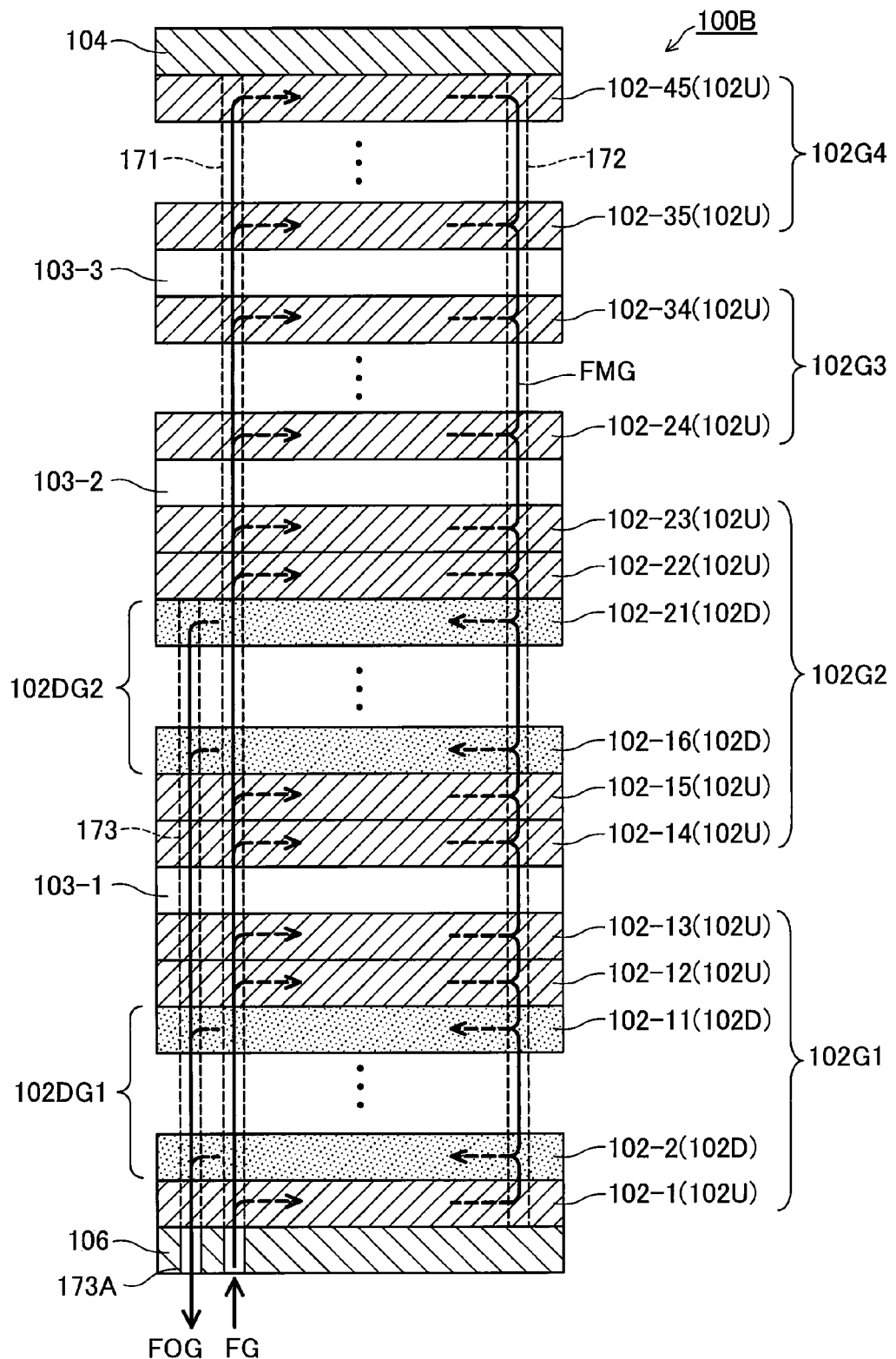
FIG. 19 Explanatory view showing the positional relationship between electricity generation units 102, heat exchange members 103, and end plates 104 and 106 in a fuel cell stack 100B according to a third embodiment.

FIG. 19 is an explanatory view showing the positional relationship between electricity generation units 102, heat exchange members 103, and end plates 104 and 106 in a fuel cell stack 100B according to a third embodiment. In FIG. 19, the structure of each electricity generation unit 102 is simplified, and a fuel gas introduction manifold 171, a fuel gas transfer manifold 172, and a fuel gas discharge manifold 173 are shown by dotted lines. In the fuel cell stack 100B according to the third embodiment, the same components as those in the aforementioned fuel cell stack 100 of the first embodiment are denoted by the same reference numerals, and description thereof is omitted.

As shown in FIG. 19, the fuel cell stack 100B includes 45 electricity generation units 102 (102-1 to 102-45), three heat exchange members 103 (103-1 to 103-3), and a pair of end plates 104 and 106. The 45 electricity generation units 102 include a first electricity generation block 102G1, a second electricity generation block 102G2, a third electricity generation block 102G3, and a fourth electricity generation block 102G4.

(First Electricity Generation Block 102G1)

The first electricity generation block 102G1 is disposed between the end plate 106 and the first heat exchange member 103-1. The first electricity generation block 102G1 includes 13 electricity generation units 102 (102-1 to 102-13) which are disposed adjacent to one another in the vertical direction. Among the 13 electricity generation units 102, 10 electricity generation units 102-2 to 102-11 (the second to eleventh units from the lower end) are downstream electricity generation units 102D. Hereinafter, the 10 downstream electricity generation units 102D will be referred to as the "first downstream electricity generation unit group 102DG1." One electricity generation unit 102-1 disposed between the first downstream electricity generation unit group 102DG1 and the end plate 106 and two electricity generation units 102-12 and 102-13 disposed between the first downstream electricity generation unit group 102DG1 and the first heat exchange member 103-1 are upstream electricity generation units 102U. Specifically, the first downstream electricity generation unit group 102DG1 is disposed away from the end plate 106 (i.e., heat-absorbing member) with the one upstream electricity generation unit 102U intervening therebetween, and the first downstream electricity generation unit group 102DG1 is disposed away from the first heat exchange member 103-1 (i.e., heat-absorbing member) with the two upstream electricity generation units 102U intervening therebetween. In each downstream electricity generation unit 102D of the first electricity generation block 102G1, the total volume (downstream communication volume) of the fuel gas supply communication hole 142D and the fuel gas discharge communication hole 143D is smaller than the total volume (upstream communication volume) of the fuel gas supply communication hole 142U and the fuel gas discharge communication hole 143U in each upstream electricity generation unit 102U. Therefore, a difference in fuel utilization rate is reduced between a plurality of the electricity generation units 102D, and thus deterioration of the performance of the entire fuel cell stack 100 can be more reliably suppressed. In addition, as compared with the case where each downstream electricity generation unit 102D is disposed adjacent to the heat-absorbing member, a decrease in the temperature of the downstream electricity generation unit 102D, which occurs through heat absorption by the heat-absorbing member, can be suppressed, thereby suppressing deterioration of the electricity generation performance of the downstream electricity generation unit 102D.

The closer the position of an electricity generation unit 102 to the discharge hole 173A communicating with the fuel gas discharge manifold 173, the greater the ease of discharge of the fuel gas FG from the anode chamber 176 of the electricity generation unit 102 and thus the greater the ease of the supply of the fuel gas FG to the anode chamber 176. In the present embodiment, five downstream electricity generation units 102D (102-2 to 102-6) are disposed in a lower region; i.e., a region between the central position (in the vertical direction) of the first electricity generation block 102G1 (i.e., the position of the electricity generation unit 102-7) and the lower end of the first electricity generation block 102G1. Four downstream electricity generation units 102D (102-8 to 102-11) are disposed in an upper region; i.e., a region between the central position (in the vertical direction) of the first electricity generation block 102G1 and the upper end of the first electricity generation block 102G1. That is, the number of downstream electricity generation units 102D disposed in the lower region near the discharge hole 173A of the fuel gas discharge manifold 173 (hereinafter the number will be referred to as "the number of electricity generation units on the discharge hole side") is larger than the number of downstream electricity generation units 102D disposed in the upper region away from the discharge hole 173A (hereinafter the number will be referred to as "the number of electricity generation units on the opposite side"). Thus, fuel shortage can be suppressed as compared with the case where the number of electricity generation units on the discharge hole side is smaller than the number of electricity generation units on the opposite side. Therefore, deterioration of the performance of the entire fuel cell stack 100B can be more reliably suppressed.

(Second Electricity Generation Block 102G2)

The second electricity generation block 102G2 is disposed between the first heat exchange member 103-1 and the second heat exchange member 103-2. The second electricity generation block 102G2 includes 10 electricity generation units 102 (102-14 to 102-23) which are disposed adjacent to one another in the vertical direction. Among the 10 electricity generation units 102, six electricity generation units 102-16 to 102-21 (the third to eighth units from the lower end) are downstream electricity generation units 102D. Hereinafter, the six downstream electricity generation units 102D will be referred to as the "second downstream electricity generation unit group 102DG2." Two electricity generation units 102-14 and 102-15 disposed between the second downstream electricity generation unit group 102DG2 and the first heat exchange member 103-1 and two electricity generation units 102-22 and 102-23 disposed between the second downstream electricity generation unit group 102DG2 and the second heat exchange member 103-2 are upstream electricity generation units 102U. Specifically, the second downstream electricity generation unit group 102DG2 is disposed away from each of the first heat exchange member 103-1 and the second heat exchange member 103-2 (i.e., heat-absorbing members) with the two upstream electricity generation units 102U intervening therebetween. In each downstream electricity generation unit 102D of the second electricity generation block 102G2, the downstream communication volume is smaller than the upstream communication volume. Therefore, in the second electricity generation block 102G2, a difference in fuel utilization rate is reduced between a plurality of electricity generation units 102D, and thus deterioration of the performance of the entire fuel cell stack 100 can be more reliably suppressed. In addition, as compared with the case where each downstream electricity generation unit 102D is disposed adjacent to the heat-absorbing member, a decrease in the temperature of the downstream electricity generation unit 102D, which occurs through heat absorption by the heat-absorbing member, can be suppressed, thereby suppressing deterioration of the electricity generation performance of the downstream electricity generation unit 102D.

(Third Electricity Generation Block 102G3)

The third electricity generation block 102G3 is disposed between the second heat exchange member 103-2 and the third heat exchange member 103-3. The third electricity generation block 102G3 includes 11 electricity generation units 102 (102-24 to 102-34) which are disposed adjacent to one another in the vertical direction. All the 11 electricity generation units 102 are upstream electricity generation units 102U.

(Fourth Electricity Generation Block 102G4)

The fourth electricity generation block 102G4 is disposed between the third heat exchange member 103-3 and the end plate 104. The fourth electricity generation block 102G4 includes 11 electricity generation units 102 (102-35 to 102-45) which are disposed adjacent to one another in the vertical direction. All the 11 electricity generation units 102 are upstream electricity generation units 102U.

(First Downstream Electricity Generation Unit Group 102DG1 and Second Downstream Electricity Generation Unit Group 102DG2)

The first downstream electricity generation unit group 102DG1 includes 10 downstream electricity generation units 102D, and the second downstream electricity generation unit group 102DG2 includes six downstream electricity generation units 102D. The first downstream electricity generation unit group 102DG1 is disposed nearer to the discharge hole 173A of the fuel gas discharge manifold 173 than is the second downstream electricity generation unit group 102DG2. That is, the number of electricity generation units 102D included in the first downstream electricity generation unit group 102DG1 is larger than that of electricity generation units 102D included in the second downstream electricity generation unit group 102DG2, and the first downstream electricity generation unit group 102DG1 is disposed nearer to the discharge hole 173A than is the second downstream electricity generation unit group 102DG2. Thus, as compared with the case where the first downstream electricity generation unit group 102DG1 is disposed farther away from the discharge hole 173A than is the second downstream electricity generation unit group 102DG2, the fuel gas FG is readily discharged from the anode chamber 176 included in the electricity generation unit 102 and accordingly the fuel gas FG is readily supplied to the anode chamber 176, and thus fuel shortage is prevented. Therefore, deterioration of the performance of the entire fuel cell stack 100B can be more reliably suppressed. The first downstream electricity generation unit group 102DG1 corresponds to the second electrochemical reaction unit group appearing in CLAIMS, and the second downstream electricity generation unit group 102DG2 corresponds to the first electrochemical reaction unit group appearing in CLAIMS.

D. Modifications

The technique disclosed in the present specification is not limited to the aforementioned embodiments, but may be modified into various other forms without departing from the gist thereof. For example, the technique may be modified as described below.

In the aforementioned first embodiment, one or three or more upstream electricity generation units 102U may be disposed between the downstream electricity generation units 102D and the heat-absorbing member. The heat exchange member 103 has a heat-absorbing ability higher than that of the end plate 104 or 106; i.e., the heat exchange member 103 absorbs a larger amount of heat. Thus, the number of upstream electricity generation units 102U disposed between the heat exchange member 103 and the downstream electricity generation units 102D may be larger than the number of upstream electricity generation units 102U disposed between the end plate 104 or 106 and the downstream electricity generation units 102D. Specifically, the number of upstream electricity generation units 102U disposed between the downstream electricity generation units 102D and the heat-absorbing member having a first heat-absorbing ability may be larger than the number of upstream electricity generation units 102U disposed between the downstream electricity generation units 102D and the heat-absorbing member having a second heat-absorbing ability lower than the first heat-absorbing ability. According to this configuration, upstream electricity generation units 102U can be disposed in an appropriate number depending on the heat-absorbing ability of the heat-absorbing member, to thereby effectively prevent a decrease in the temperature of the downstream electricity generation units 102D due to heat absorption by the heat-absorbing member.

The heat-absorbing member is not limited to the heat exchange member 103 or the end plate 104 or 106, but may be, for example, a terminal plate. Thus, the heat-absorbing member may be any member that is disposed adjacent to the electrochemical reaction unit and absorbs heat generated from the electrochemical reaction unit during operation of the electrochemical reaction cell stack.

In the case where the electrochemical reaction cell stack includes a plurality of electrochemical reaction blocks, the present invention is not necessarily applied to all the electrochemical reaction blocks, so long as the invention is applied to at least one electrochemical reaction block. For example, in the third embodiment, either the first downstream electricity generation unit group 102DG1 or the second downstream electricity generation unit group 102DG2 may be disposed adjacent to the heat-absorbing member. All the electrochemical reaction units arranged in the first direction between the first and second heat-absorbing members correspond to the three or more electrochemical reaction units (electrochemical reaction blocks) appearing in CLAIMS. All the electrochemical reaction units should satisfy the following requirement of the present invention: "the upstream electrochemical reaction unit(s) is(are) disposed between the first heat-absorbing member and the downstream electrochemical reaction unit disposed closest to the first heat-absorbing member, and the upstream electrochemical reaction unit(s) is(are) disposed between the second heat-absorbing member and the downstream electrochemical reaction unit disposed closest to the second heat-absorbing member." Specifically, all the electrochemical reaction units arranged in the first direction between the end plate and the heat exchange member or between the two heat exchange members correspond to the three or more electrochemical reaction units appearing in CLAIMS. For example, in the configuration shown in FIG. 19 according to the third embodiment, the 13 electricity generation units 102 (102-1 to 102-13) disposed between the end plate 106 and the first heat exchange member 103-1 correspond to the three or more electrochemical reaction units appearing in CLAIMS. The 10 electricity generation units 102 (102-14 to 102-23) disposed between the first heat exchange member 103-1 and the second heat exchange member 103-2 correspond to the three or more electrochemical reaction units appearing in CLAIMS.

In the first embodiment, the downstream communication volume may be larger than 60 (mm$^3$), so long as the downstream communication volume in any downstream electricity generation unit 102D is smaller than the upstream communication volume in any upstream electricity generation unit 102U.

In the aforementioned embodiments, the number of electricity generation units 102 included in the fuel cell stack 100 is a mere example and is determined as appropriate in accordance with, for example, a required output voltage of the fuel cell stack 100. The number of upstream electricity generation units 102U or downstream electricity generation units 102D is a mere example. The hydrogen concentration of a gas (fuel gas FG or fuel medium gas FMG) supplied to the anode chamber 176 in each downstream electricity generation unit 102D is lower than that of a gas supplied to the anode chamber 176 in each upstream electricity generation unit 102U. Thus, the number of downstream electricity generation units 102D is preferably smaller than the number of upstream electricity generation units 102U for preventing insufficient supply of gas in the downstream electricity generation units 102D.

In the aforementioned embodiments, the number of the bolts 22 used for fastening of the fuel cell stack 100 is a mere example and is determined as appropriate in accordance with, for example, a required fastening force of the fuel cell stack 100.

In the aforementioned embodiments, the nut 24 is engaged with each of opposite ends of the bolt 22. However, the bolt 22 may have a head, and the nut 24 may be engaged with only an end of the bolt 22 opposite the head.

In the aforementioned embodiments, the end plates 104 and 106 function as output terminals. However, other members connected respectively to the end plates 104 and 106 (e.g., electrically conductive plates disposed respectively between the end plate 104 and the corresponding electricity generation unit 102 and between the end plate 106 and the corresponding electricity generation unit 102) may function as output terminals.

In the aforementioned embodiments, the spaces between the outer circumferential surfaces of shaft portions of the bolts 22 and the inner circumferential surfaces of the communication holes 108 are utilized as manifolds. However, axial holes may be provided in the shaft portions of the bolts 22 for use as the manifolds. Also, the manifolds may be provided separately from the communication holes 108 into which the bolts 22 are inserted.

In the aforementioned embodiments, in the case where two electricity generation units 102 are disposed adjacent to each other, the adjacent two electricity generation units 102 share a single interconnector 150. However, even in such a case, two electricity generation units 102 may have respective interconnectors 150. Also, in the aforementioned embodiments, the uppermost electricity generation unit 102 in the fuel cell stack 100 does not have the upper interconnector 150, and the lowermost electricity generation unit 102 in the fuel cell stack 100 does not have the lower interconnector 150. However, these interconnectors 150 may be provided without elimination.

In the aforementioned embodiments, the anode-side current collector 144 may have a structure similar to that of the cathode-side current collector 134, and the anode-side current collector 144 and the adjacent interconnector 150 may be integrally formed as a unitary member. The anode-side frame 140 rather than the cathode-side frame 130 may be an insulator. Also, the cathode-side frame 130 or the anode-side frame 140 may have a multilayer structure.

In the aforementioned embodiments, materials used for formation of the members are provided merely by way of example. Other materials may be used to form the members.

In the aforementioned embodiments, the hydrogen-rich fuel gas FG is obtained by reforming city gas. However, the fuel gas FG may be obtained from another material, such as LP gas, kerosene, methanol, or gasoline. Alternatively, pure hydrogen may be used as the fuel gas FG.

In the present specification, the "structure in which a member (or a certain portion of the member; the same also applies in the following description) B and a member C face each other with a member A intervening therebetween" is not limited to a structure in which the member A is adjacent to the member B or the member C, but includes a structure in which another component element intervenes between the member A and the member B or between the member A and the member C. For example, a structure in which another layer intervenes between the electrolyte layer 112 and the cathode 114 can be said to be a structure in which the cathode 114 and the anode 116 face each other with the electrolyte layer 112 intervening therebetween.

In the aforementioned embodiments, the fuel cell stack 100 has a structure including a plurality of stacked flat-plate-shaped electricity generation units 102. However, the present invention may be applied to another structure; for example, a structure disclosed in Japanese Patent Application Laid-Open (kokai) No. 2008-59797 wherein a plurality of approximately cylindrical fuel cell unit cells are connected in series.

The aforementioned embodiments correspond to an SOFC for generating electricity by utilizing the electrochemical reaction between hydrogen contained in fuel gas and oxygen contained in oxidizer gas; however, the present invention is also applicable to an electrolysis cell unit which is the smallest unit of a solid oxide electrolysis cell (SOEC) for generating hydrogen by utilizing the electrolysis of water, and to an electrolysis cell stack having a plurality of electrolysis cell units. Since the structure of the electrolysis cell stack is publicly known as described in, for example, Japanese Patent Application Laid-Open (kokai) No. 2016-81813, detailed description thereof is omitted, but schematically, the electrolysis cell stack has a structure similar to that of the fuel cell stack 100 in the aforementioned embodiments. That is, the fuel cell stack 100 in the aforementioned embodiments may be read as "electrolysis cell stack," and the electricity generation unit 102 may be read as "electrolysis cell unit." However, in operation of the electrolysis cell stack, voltage is applied between the cathode 114 and the anode 116 such that the cathode 114 is a positive electrode (anode), whereas the anode 116 is a negative electrode (cathode), and water vapor is supplied as material gas through the communication hole 108. Consequently, the electrolysis of water occurs in the electrolysis cell units, whereby hydrogen gas is generated in the anode chambers 176, and hydrogen is discharged to the outside of the electrolysis cell stack through the communication hole 108. Even in the electrolysis cell stack having the aforementioned structure, the above-described effects can be obtained through application of the present invention.

DESCRIPTION OF REFERENCE NUMERALS AND SYMBOLS

22: bolt; 24: nut; 26: insulation sheet; 27: gas passage member; 28: body portion; 29: branch portion; 100, 100A, 100B: fuel cell stack; 102: electricity generation unit; 102D: downstream electricity generation unit; 102DG1: first downstream electricity generation unit group; 102DG2: second downstream electricity generation unit group; 102G1: first electricity generation block; 102G2: second electricity generation block; 102G3: third electricity generation block; 102G4: fourth electricity generation block; 102G: electricity generation block; 102U: upstream electricity generation unit; 103: heat exchange member; 104, 106: end plate; 108: communication hole; 110: unit cell; 112: electrolyte layer; 114: cathode; 116: anode; 120: separator; 121: hole; 124: bonding member; 130: cathode-side frame; 131: hole; 132: oxidizer gas supply communication hole; 133: oxidizer gas discharge communication hole; 134: cathode-side current collector; 140: anode-side frame; 141: hole; 142: fuel gas supply communication hole; 142D: fuel gas supply communication hole; 142U: fuel gas supply communication hole; 143: fuel gas discharge communication hole; 143D: fuel gas discharge communication hole; 143U: fuel gas discharge communication hole; 144: anode-side current collector; 145: electrode facing portion; 146: interconnector facing portion; 147: connection portion; 149: spacer; 150: interconnector; 161: oxidizer gas introduction manifold; 162: oxidizer gas discharge manifold; 163: oxidizer gas supply manifold; 166: cathode chamber; 171: fuel gas introduction manifold; 172: fuel gas transfer manifold; 173: fuel gas discharge manifold; 173A: discharge hole; 176: anode chamber; 182: hole; 184: communication hole; 186: communication hole; 188: heat exchange flow passage; FG: fuel gas; FMG: fuel medium gas; FOG: fuel offgas; OG: oxidizer gas; and OOG: oxidizer offgas

The invention claimed is:

1. An electrochemical reaction cell stack comprising:
an electrochemical reaction block including three or more electrochemical reaction units arranged in a first direction, each of the electrochemical reaction units including an electrolyte layer, a cathode and an anode which face each other in the first direction with the electrolyte layer intervening therebetween, and an anode chamber facing the anode;
a first heat-absorbing member which is disposed on one side of the electrochemical reaction block in the first direction and absorbs heat generated from the electrochemical reaction block; and
a second heat-absorbing member which is disposed on the other side of the electrochemical reaction block in the first direction and absorbs heat generated from the electrochemical reaction block, the electrochemical reaction cell stack being characterized in that:
the three or more electrochemical reaction units include two or more upstream electrochemical reaction units, and one or more downstream electrochemical reaction units;
the electrochemical reaction cell stack includes a gas flow passage which communicates with the anode chamber included in each of the two or more upstream electrochemical reaction units and with the anode chamber included in each of the one or more downstream electrochemical reaction units, and which introduces a gas discharged from the upstream anode chamber into the downstream anode chamber;
the upstream electrochemical reaction unit(s) is(are) disposed between the first heat-absorbing member and the downstream electrochemical reaction unit disposed closest to the first heat-absorbing member; and
the upstream electrochemical reaction unit(s) is(are) disposed between the second heat-absorbing member and the downstream electrochemical reaction unit disposed closest to the second heat-absorbing member.

2. An electrochemical reaction cell stack according to claim 1, wherein:
the first heat-absorbing member is a heat exchange member which exchanges heat between a gas introduced into the first heat-absorbing member and the electrochemical reaction unit adjacent to the first heat-absorbing member in the first direction; and
the second heat-absorbing member is an end plate disposed at one end of the electrochemical reaction cell stack in the first direction.

3. An electrochemical reaction cell stack according to claim 2, wherein:
the number of the upstream electrochemical reaction units disposed between the first heat-absorbing member and the downstream electrochemical reaction unit disposed closest to the first heat-absorbing member is two or more; and
the number of the upstream electrochemical reaction units disposed between the second heat-absorbing member and the downstream electrochemical reaction unit disposed closest to the second heat-absorbing member is two or more.

4. An electrochemical reaction cell stack according to claim 1, wherein:
the number of the upstream electrochemical reaction units disposed between the first heat-absorbing member and the downstream electrochemical reaction unit disposed closest to the first heat-absorbing member is two or more; and
the number of the upstream electrochemical reaction units disposed between the second heat-absorbing member and the downstream electrochemical reaction unit disposed closest to the second heat-absorbing member is two or more.

\* \* \* \* \*